US011737135B2

(12) United States Patent
Li et al.

(10) Patent No.: US 11,737,135 B2
(45) Date of Patent: Aug. 22, 2023

(54) METHOD AND APPARATUS FOR UPLINK TRANSMISSIONS IN FRAME-BASED EQUIPMENT NR UNLICENSED

(71) Applicant: Samsung Electronics Co., Ltd., Suwon-si (KR)

(72) Inventors: Yingzhe Li, Sunnyvale, CA (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 16/947,511

(22) Filed: Aug. 4, 2020

(65) Prior Publication Data

US 2021/0084683 A1  Mar. 18, 2021

Related U.S. Application Data

(60) Provisional application No. 62/932,166, filed on Nov. 7, 2019, provisional application No. 62/900,163, filed on Sep. 13, 2019.

(51) Int. Cl.
*H04W 4/00* (2018.01)
*H04W 74/08* (2009.01)
(Continued)

(52) U.S. Cl.
CPC ....... *H04W 74/0808* (2013.01); *H04W 16/14* (2013.01); *H04W 72/042* (2013.01); *H04W 74/0833* (2013.01)

(58) Field of Classification Search
CPC ............. H04W 74/0808; H04W 16/14; H04W 72/042; H04W 74/0833
See application file for complete search history.

(56) References Cited

U.S. PATENT DOCUMENTS 10,736,140 B2    8/2020  Park et al.
2018/0115347 A1*  4/2018  Yerramalli ........... H04B 7/0404
(Continued)

FOREIGN PATENT DOCUMENTS

WO    2017/155305 A1    9/2017

OTHER PUBLICATIONS

"3rd Generation Partnership Project; Technical Specification Group Radio Access Network; NR; Physical channels and modulation (Release 15)", 3GPP TS 38.211 V15.4.0, Dec. 2018, 96 pages.
(Continued)

*Primary Examiner* — Siren Wei

(57) ABSTRACT

Methods and apparatuses of a BSs and UEs in a wireless communication system are provided. A method of operating the UE comprises: receiving, from a BS over a shared spectrum channel, a first DCI including a COT of the BS; determining a first portion of the COT for a downlink transmission from the BS and a second portion of the COT for an uplink transmission to the BS, wherein the COT includes a gap between the first and second portions of the COT; performing a channel access procedure based on a duration of the gap; receiving the downlink transmission in the first portion of the COT; and transmitting the uplink transmission in the second portion of the COT based on a sensing status of the shared spectrum channel that is sensed as an idle state during the channel access procedure in the duration of the gap.

17 Claims, 14 Drawing Sheets

(51) Int. Cl.
*H04W 16/14* (2009.01)
*H04W 72/04* (2023.01)

(56) References Cited

U.S. PATENT DOCUMENTS

| | | | | |
|---|---|---|---|---|
| 2020/0145972 A1* | 5/2020 | Kwak | .................... | H04L 5/0094 |
| 2020/0275484 A1* | 8/2020 | Xu | ....................... | H04W 72/042 |
| 2021/0235487 A1* | 7/2021 | Park | .................... | H04W 72/042 |
| 2021/0289548 A1* | 9/2021 | Murray | ............. | H04W 74/0808 |
| 2021/0345406 A1* | 11/2021 | Myung | ................. | H04W 24/08 |

OTHER PUBLICATIONS

"3rd Generation Partnership Project; Technical Specification Group Radio Access Network; NR; Multiplexing and channel coding (Release 15)", 3GPP TS 38.212 V15.4.0, Dec. 2018, 100 pages.
"3rd Generation Partnership Project; Technical Specification Group Radio Access Network; NR; Physical layer procedures for control (Release 15)" 3GPP TS 38.213 V15.4.0, Dec. 2018, 104 pages.
"3rd Generation Partnership Project; Technical Specification Group Radio Access Network; NR; Physical layer procedures for data (Release 15)", 3GPP TS 38.214 V15.4.0, Dec. 2018, 102 pages.
"3rd Generation Partnership Project; Technical Specification Group Radio Access Network; NR; Radio Resource Control (RRC) protocol specification (Release 15)", 3GPP TS 38.331 V15.4.0, Dec. 2018, 474 pages.
ETSI EN 301 893 V2.1.1, "5 GHz RLAN; Harmonised Standard covering the essential requirements of article 3.2 of Directive 2014/53/EU", May 2017—135 pages.
ETSI EN 302 567 V2.1.1, "Multiple-Gigabit/s radio equipment operating in the 60 GHz band; Harmonised Standard covering the essential requirements of article 3.2 of Directive 2014/53/EU", Jul. 2017—40 pages.
"3rd Generation Partnership Project; Technical Specification Group Radio Access Network; Study on Licensed-Assisted Access to Unlicensed Spectrum (Release 13)", 3GPP TR 36.889 V13.0.0, Jun. 2015—87 pages.
IEEE Std 802.11-2016, "Part 11: Wireless LAN Medium Access Control (MAC) and Physical Layer (PHY) Specifications", 2016—3534 pages.
Huawei, HiSilicon, "Coexistence and channel access for NR unlicensed band operations", 3GPP TSG RAN WG1 Meeting #98, Aug. 26-30, 2019, R1-1908109, 21 pages.
LG Electronics, "Channel access procedure for NR-U", 3GPP TSG RAN WG1 Meeting #98, Aug. 26-30, 2019, R1-1908535, 15 pages.
MediaTek Inc., "Discussion on Channel Access Procedure", 3GPP TSG RAN WG1 #97, Aug. 26-30, 2019, R1-1908385, 21 pages.
ITRI, "Discussion on PDCCH monitoring after a COT initiated by gNB in NR-U", 3GPP TSG RAN WG1 Meeting #97, May 13-17, 2019, R1-1907308, 5 pages.
International Search Report dated Dec. 22, 2020 in connection with International Patent Application No. PCT/KR2020/012322, 3 pages.
Supplementary European Search Report dated Dec. 6, 2021, in connection with European Application No. 20862660.6, 7 pages.
Nokia, et al., "Channel access and co-existence or NR-U operation," R1-1904186, 3GPP TSG RAN WG1 Meeting #96bis, Xi'an, China, Apr. 8-12, 2019, 11 pages.

* cited by examiner

METHOD AND APPARATUS FOR UPLINK TRANSMISSIONS IN FRAME-BASED EQUIPMENT NR UNLICENSED

CROSS-REFERENCE TO RELATED APPLICATIONS AND CLAIM OF PRIORITY

The present application claims priority to U.S. Provisional Patent Application Ser. No. 62/900,163, filed on Sep. 13, 2019 and U.S. Provisional Patent Application Ser. No. 62/932,166, filed on Nov. 7, 2019. The content of the above-identified patent document is incorporated herein by reference.

TECHNICAL FIELD

The present application relates generally to wireless communication systems, more specifically, the present disclosure relates to uplink transmission in frame-based equipment NR unlicensed.

BACKGROUND

A communication system includes a downlink (DL) that conveys signals from transmission points such as base stations (BSs) or NodeBs to user equipments (UEs) and an uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB (eNB), referring to a NodeB in long-term evolution (LTE) communication system, and a gNodeB (gNB), referring to a NodeB in new radio (NR) communication system, may also be referred to as an access point or other equivalent terminology.

SUMMARY

The present disclosure relates to a pre-5G or 5G communication system to be provided for uplink transmission in frame-based equipment NR unlicensed.

In one embodiment, a user equipment (UE) in a wireless communication system supporting a shared spectrum channel access is provided. The UE comprises a transceiver configured to receive, from a base station (BS) over a shared spectrum channel, a first downlink control information (DCI) including a channel occupancy time (COT) of the BS. The UE further comprises a processor operably connected to the transceiver, the processer configured to: determine a first portion of the COT for a downlink transmission from the BS and a second portion of the COT for an uplink transmission to the BS, wherein the COT includes a gap between the first and second portions of the COT; and perform a channel access procedure based on a duration of the gap. The transceiver of the UE is further configured to: receive, from the BS over the shared spectrum channel, the downlink transmission in the first portion of the COT, and transmit, to the BS over the shared spectrum channel, the uplink transmission in the second portion of the COT, if the shared spectrum channel is sensed as an idle state during the channel access procedure in the duration of the gap.

In another embodiment, a base station (BS) in a wireless communication system supporting a shared spectrum channel access is provided. The BS comprises a processor configured to indicate a first portion of channel occupancy time (COT) for a downlink transmission to a user equipment (UE) and a second portion of the COT for an uplink transmission from the UE, wherein the COT includes a gap between the first and second portions of the COT. The BS further comprises a transceiver operably connected to the processor, the transceiver configured to: transmit, to the UE over a shared spectrum channel, a first downlink control information (DCI) including the COT of the BS, transmit, to the UE over the shared spectrum channel, the downlink transmission in the first portion of the COT, and receive, from the UE over the shared spectrum channel, the uplink transmission in the second portion of the COT, if the shared spectrum channel is sensed as an idle state during a channel access procedure that is performed based on a duration of the gap.

In yet another embodiment, a method of a user equipment (UE) in a wireless communication system supporting a shared spectrum channel access is provided. The method comprises: receiving, from a base station (BS) over a shared spectrum channel, a first downlink control information (DCI) including a channel occupancy time (COT) of the BS; and determining a first portion of the COT for a downlink transmission from the BS and a second portion of the COT for an uplink transmission to the BS, wherein the COT includes a gap between the first and second portions of the COT; performing a channel access procedure based on a duration of the gap; receiving, from the BS over the shared spectrum channel, the downlink transmission in the first portion of the COT; and transmitting, to the BS over the shared spectrum channel, the uplink transmission in the second portion of the COT based on a sensing status of the shared spectrum channel that is sensed as an idle state during the channel access procedure in the duration of the gap.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.4.0, "NR; Physical channels and modulation;" 3GPP TS 38.212 v15.4.0, "NR; Multiplexing and Channel coding;" 3GPP TS 38.213 v15.4.0, "NR; Physical Layer Procedures for Control;" 3GPP TS 38.214 v15.4.0, "NR; Physical Layer Procedures for Data;" 3GPP TS 38.331 v15.4.0, "NR; Radio Resource Control (RRC) Protocol Specification;" ETSI EN 301 893 V2.1.1, "5 GHz RLAN; Harmonised Standard covering the essential requirements of article 3.2 of Directive 2014/53/EU", 2017; ETSI EN 302 567 V2.1.1, "Multiple-Gigabit/s radio equipment operating in the 60 GHz band; Harmonised Standard covering the essential requirements of article 3.2 of Directive 2014/53/EU", 2017; 3GPP TR 36.889 V13.0.0, "Study on Licensed-Assisted Access to Unlicensed Spectrum", 2015; and IEEE Std 802.11-2016, "Part 11: Wireless LAN Medium Access Control (MAC) and Physical Layer (PHY) Specifications", 2016.

Figure 1:
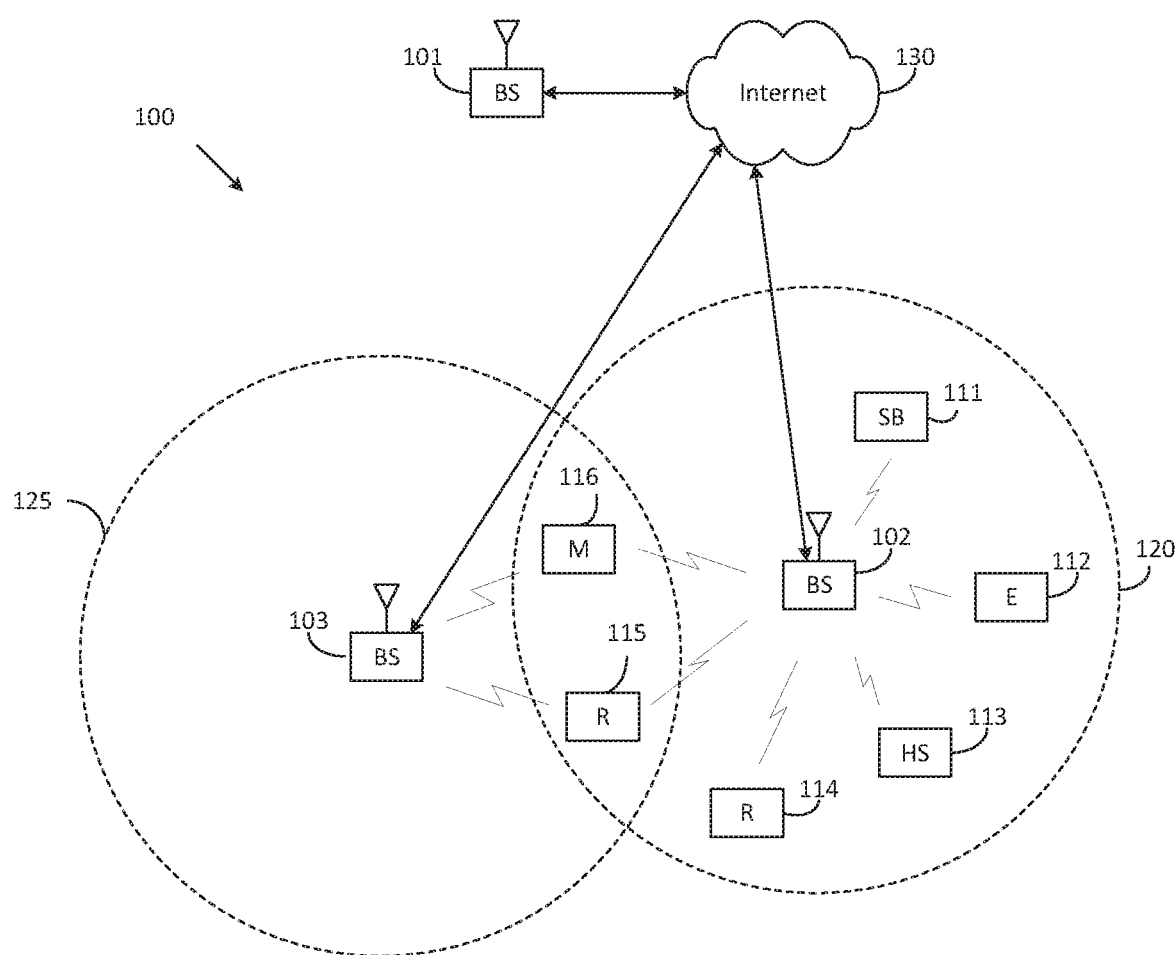
FIG. 1 illustrates an example wireless network according to embodiments of the present disclosure.
Figure 2:
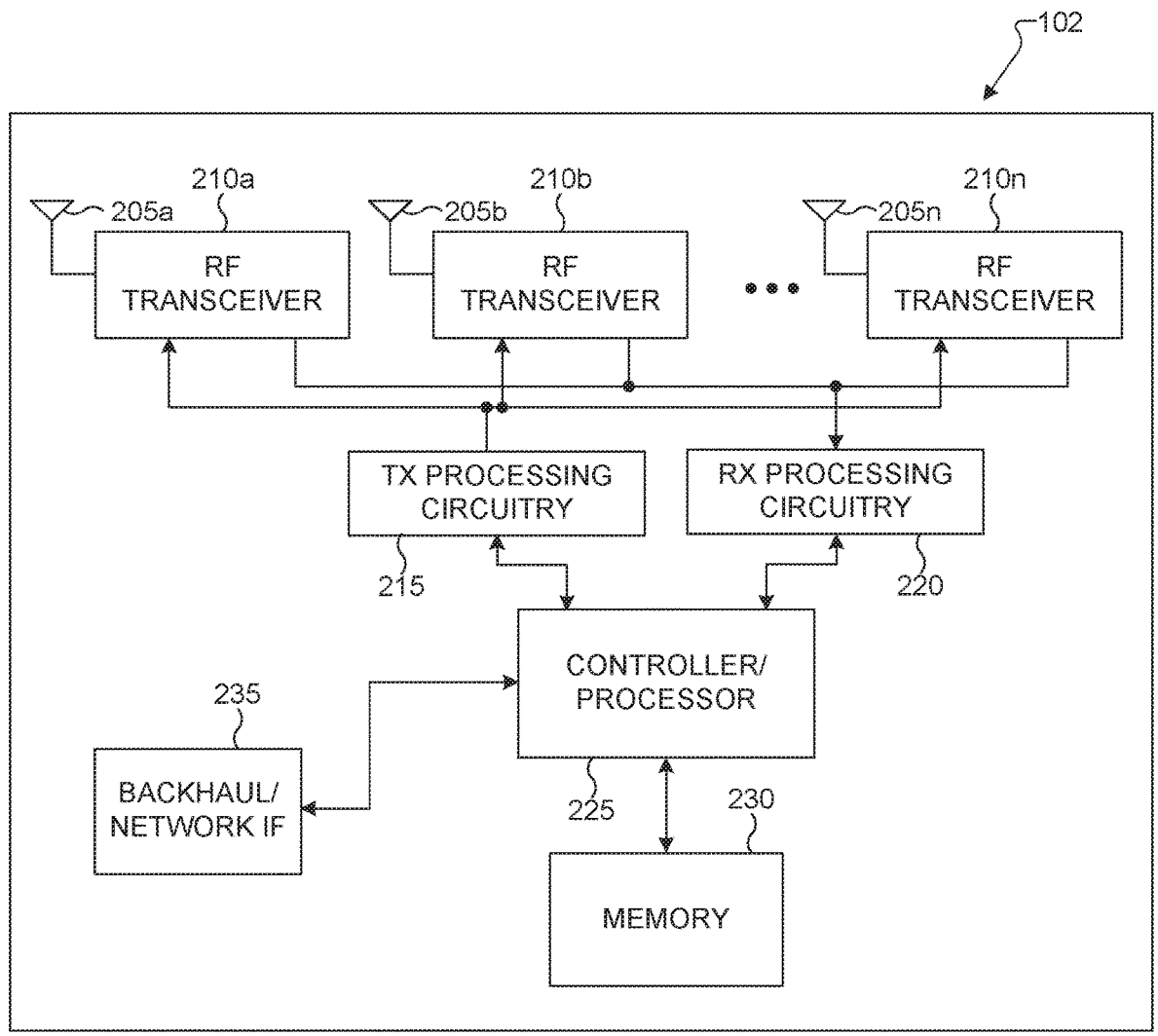
FIG. 2 illustrates an example gNB according to embodiments of the present disclosure.
Figure 3:
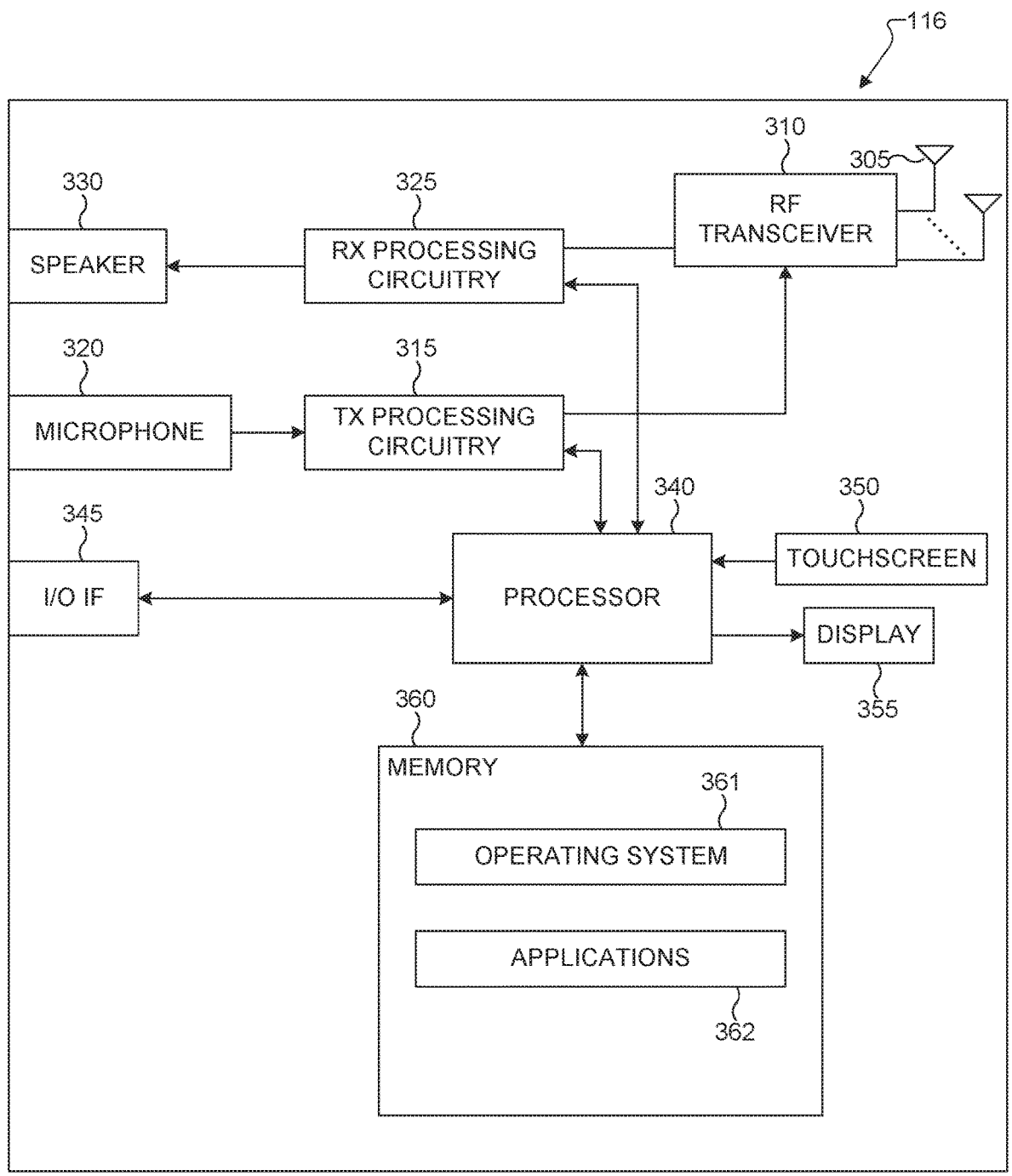
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for uplink transmissions in frame-based equipment in NR unlicensed. In certain embodiments, and one or more of the gNBs 101-103 includes circuitry, programing, or a combination thereof, for efficient uplink transmission in frame-based equipment NR unlicensed.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MC S) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
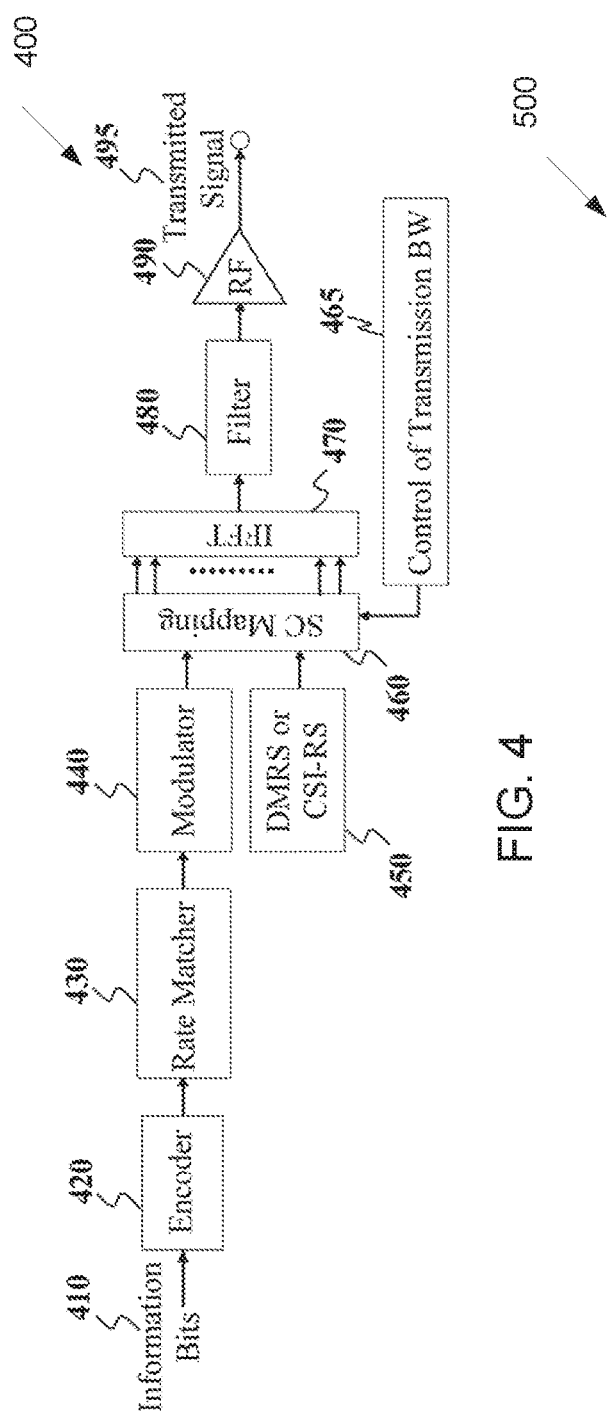
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping unit 465, an inverse fast Fourier transform (IFFT) is performed by filter 470, a cyclic prefix (CP) is added by CP insertion unit 480, and a resulting signal is filtered by filter 490 and transmitted by a radio frequency (RF) unit 495.

Figure 5:
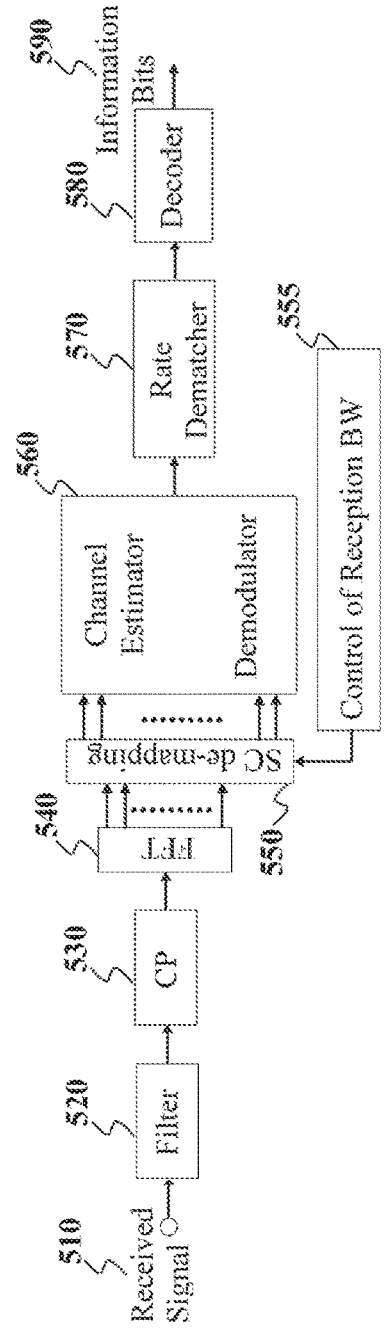
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal unit removes a CP 530, a filter 540 applies a fast Fourier transform (FFT), SCs de-mapping unit 550 de-maps SCs selected by BW selector unit 555, received symbols are demodulated by a channel estimator and a demodulator unit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
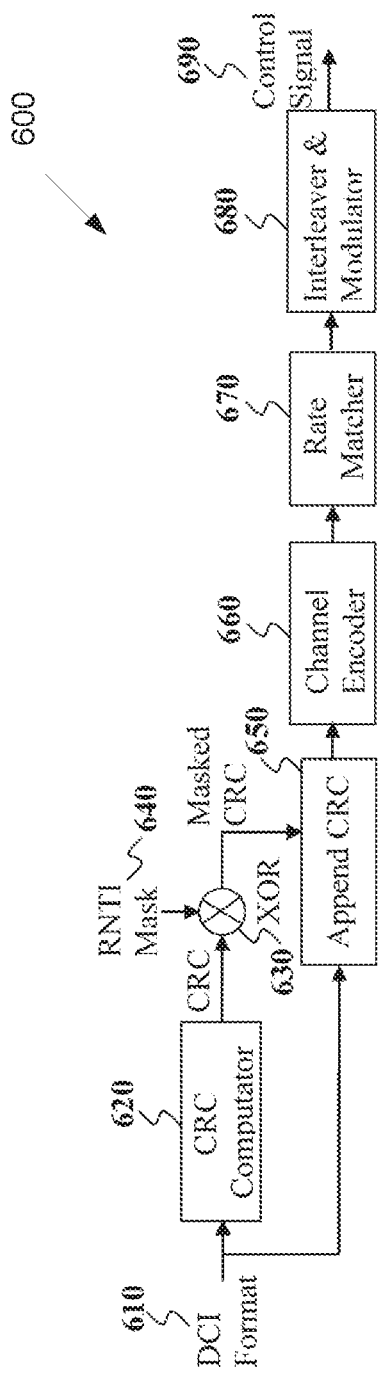
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation unit 620, and the CRC is masked using an exclusive OR (XOR) operation unit 630 between CRC bits and RNTI bits 640. The XOR operation is defined as XOR (0, 0)=0, XOR (0, 1)=1, XOR (1, 0)=1, XOR (1, 1)=0. The masked CRC bits are appended to DCI format information bits using a CRC append unit 650. An encoder 660 performs channel coding (such as tail-biting convolutional coding or polar coding), followed by rate matching to allocated resources by rate matcher 670. Interleaving and modulation units 680 apply interleaving and modulation, such as QPSK, and the output control signal 690 is transmitted.

Figure 7:
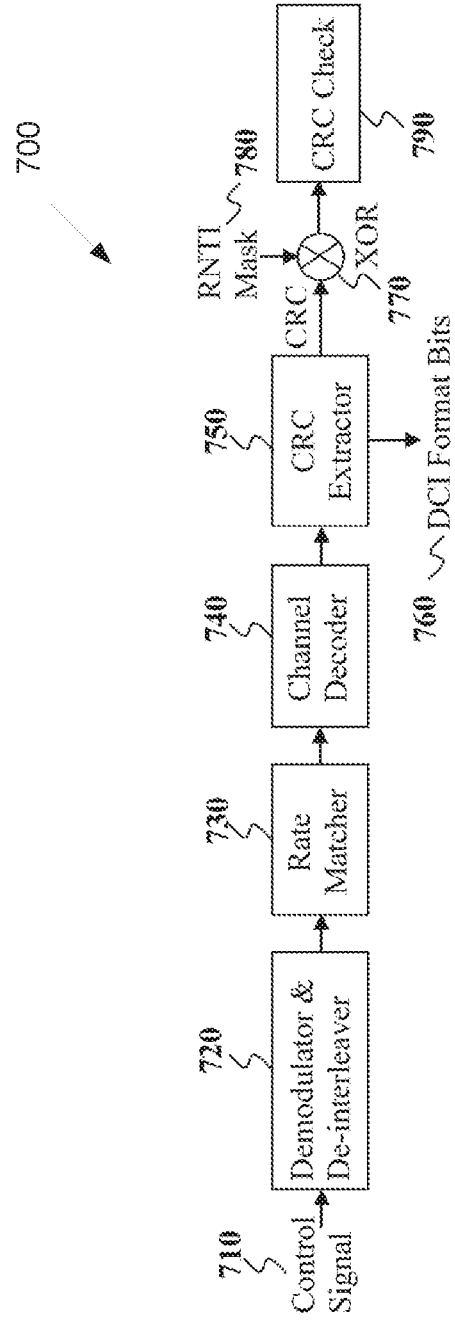
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by unit 790. When the CRC check succeeds (checksum is zero), the DCI format information bits are considered to be valid. When the CRC check does not succeed, the DCI format information bits are considered to be invalid.

A frame based equipment (FBE) is a channel access mechanism wherein the transmit/receive structure has a periodic timing with a periodicity named the fixed frame period (FFP); and that the initiating device may perform listen-before-talk (LBT) during an observation slot before starting transmissions on an operating channel at the start of a FFP. The FFP is within 1 ms to 10 ms, and the observation slot is at least 9 microseconds. If the LBT fails on an operating channel, the initiating device may not transmit on that channel, except for short control signaling transmissions providing it complies with certain requirements. The channel occupancy time (COT) associated with a successful LBT check for FBE operation may be no greater than 95% of the FFP, and may be followed by an idle period until the start of next FFP such that the idle period is at least the max(5% of channel occupancy time, 100 microseconds).

Figure 8:
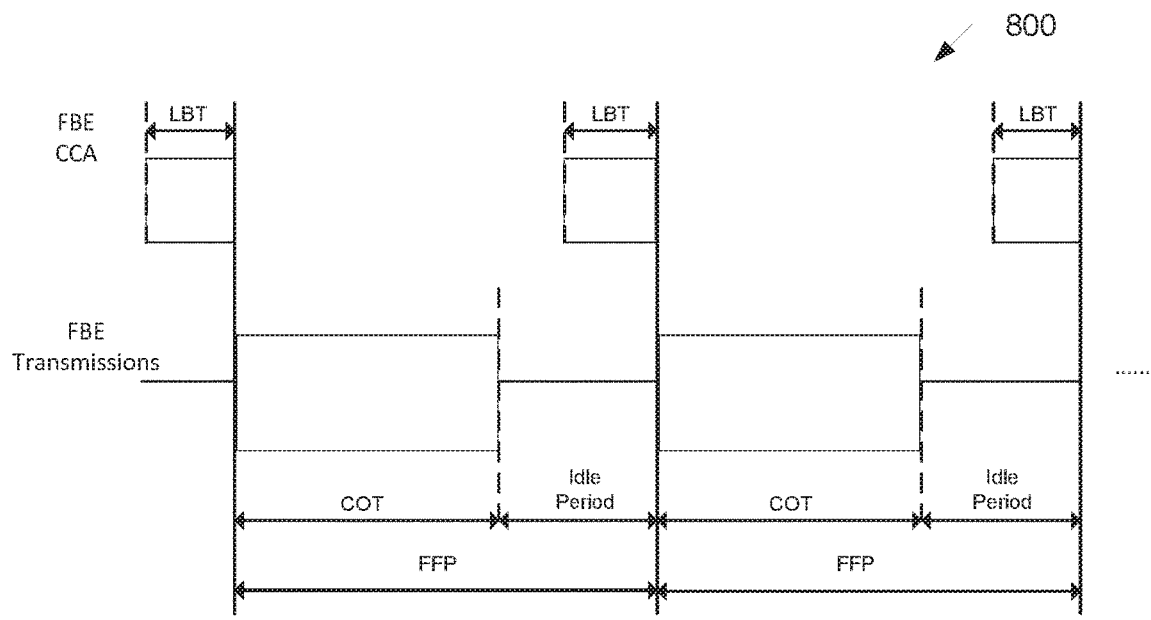
FIG. 8 illustrates an example timing for FBE operation according to embodiments of the present disclosure.

FIG. 8 illustrates an example timing for FBE operation 800 according to embodiments of the present disclosure. An embodiment of the timing for FBE operation 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

In the present disclosure, an observation slot refers to the duration for an FBE device to perform LBT, while an NR-U slot refers to a slot of 14 OFDM symbols of the NR-U system.

Besides the load-based equipment (LBE) operation mode, NR unlicensed (NR-U) can also support the above FBE operation mode for various application scenarios. Examples can include a single NR-U operator exists in the operating channel(s) and other Wi-Fi network can be precluded (e.g., by deployment); and two or more NR-U operators coexist in the operating channel(s), potentially with coordination among the operators; and one or more NR-U operator coexist with an FBE operation based Wi-Fi network; etc. Compared to the LBE operation mode, the FBE operation mode can potentially have higher spectrum utilization under such scenarios, given the much simpler LBT process in FBE operation than the ones in LBE operation.

The present disclosure focuses on the enhancements of Rel-15 NR to support uplink transmissions for FBE NR-U, which includes enhancements to scheduled UL transmission for FBE NR-U, enhancements to configured grant UL transmissions for FBE NR-U, and enhancements to PRACH transmissions for FBE NR-U.

The present disclosure includes several embodiments, principles, approaches and examples that can be used in conjunction or in combination with one another, or can operate as standalone. The embodiments/principles/approaches/examples in this disclosure can be applied to FBE-based NR-U, LBE-based NR-U, or both FBE-based and LBE-based NR-U.

In the present disclosure, FR1 NR-U refers to NR-U that operates in the unlicensed/shared bands in FR1, such as the 5 GHz unlicensed bands or the 6 GHz unlicensed/shared bands; and FR2 GHz NR-U refers to NR-U that operators in the unlicensed/shared bands in FR2, such as the 60 GHz unlicensed bands.

The present disclosure focuses on the enhancements of Rel-15 NR to support uplink transmissions for FBE NR-U, which includes enhancements to scheduled UL transmission for FBE NR-U, enhancements to configured grant UL transmissions for FBE NR-U, and enhancements to PRACH transmissions for FBE NR-U.

In one embodiment, the signaling and indication methods are provided to support PUSCH transmissions scheduled by UL grant for FBE NR-U.

In one embodiment, the general LBT type for granting UL transmissions for NR-U can include: CAT-4 LBT, wherein each CAT-4 LBT type can have a corresponding LBT priority class value. For example, there can be a total of 4 LBT priority class values, and the lower the priority class value, the higher the channel access priority. The CAT-4 LBT can be used by the UE to obtain a UE-initiated COT; CAT-2 LBT of T μs duration, where 16<=T<=25. This can be used when the gap from the start of the UL transmission to the end of previous transmission is at least 16 μs, and the CAT-2 LBT is successful if the energy detected on the operating channel during a single observation slot or two observation slots within the T μs duration is below the energy detection threshold; and CAT-1 LBT with immediate transmission. This can be used when the gap from the start of the UL transmission to the end of previous transmission is less than 16 μs.

In one embodiment, the LBT type for UL transmission in FBE NR-U can include CAT-2 LBT and CAT-1 LBT and does not include CAT-4 LBT.

In one example, the CAT-2 LBT for UL transmission in FBE NR-U can include only 1 type. In one sub-example, a successful CAT-2 LBT can be referred to the operating channel during a single observation slot within a 25 μs duration ending immediately before the start of the UL transmission is below the energy detection threshold. In another sub-example, a successful CAT-2 LBT can be referred to the operating channel during two observation slots within a 25 μs duration ending immediately before the start of the UL transmission are both below the energy detection threshold.

In one example, the CAT-2 LBT for UL transmission in FBE NR-U can include 2 types, with one type being CAT-2 LBT of 16 μs duration and the other type being CAT-2 LBT of 25 μs duration. In one sub-example, a successful CAT-2 LBT of 16 μs can be referred to the operating channel during a single observation slot or two observation slots within a 16 μs duration ending immediately before the start of the UL transmission is below the energy detection threshold. In another sub-example, a successful CAT-2 LBT of 25 μs can be referred to the operating channel during a single observation slot or two observation slots within a 25 μs duration ending immediately before the start of the UL transmission are below the energy detection threshold.

In one example, the CAT-4 LBT and correspondingly the LBT priority class value for CAT-4 LBT do not need to be indicated for UL transmissions in FBE NR-U.

In one example, the LBT type for scheduled UL transmission in FBE NR-U can be explicitly indicated through the UL grant that schedules the UL transmissions.

In one example, the UL grant can have an LBT type field to indicate one of the CAT-1 LBT or CAT-2 LBT. In one sub-example, the number of bits for the LBT type field in the UL grant requires 1 bit. In another sub-example, the CAT-2 LBT can refer to the CAT-2 LBT type as in the mentioned embodiments and/or examples. In another sub-example, the CAT-2 LBT can refer to one of the CAT-2 LBT of 16 μs or CAT-2 LBT of 25 μs, wherein the higher layer parameter (e.g., RRC parameter) can configure one of the CAT-2 LBT of 16 μs or CAT-2 LBT of 25 μs to be indicated by the UL grant. In yet another sub-example, the CAT-2 LBT can refer to one of the CAT-2 LBT of 16 μs or CAT-2 LBT of 25 μs, which can be fixed in the specification. In yet another sub-example, CAT-1 LBT can be scheduled by the gNB if the end of the previous transmission within the fixed frame period (FFP) and the start of the scheduled UL transmission is at most 16 μs.

In one example, the UL grant can have an LBT type field to indicate one of the CAT-1 LBT, CAT-2 LBT of 16 μs, and CAT-2 LBT of 25 μs. In one sub-example, the number of bits for the LBT type field in the UL grant requires 2 bits. In another sub-example, the CAT-2 LBT of 16 μs, and CAT-2 LBT of 25 μs can refer to the CAT-2 LBT type as in the mentioned embodiments and/or examples.

In one example, the starting and length indicator value (SLIV) indicated in the UL grant for the scheduled UL transmission can be interpreted as the starting symbol for the LBT operation before the scheduled UL transmission, and the UL transmission can start after the LBT operation is finished. In one sub-example, the UL transmission may be punctured in the first symbol after the LBT operation.

In one example, the starting and length indicator value (SLIV) indicated in the UL grant for the scheduled UL transmission can be interpreted as the starting symbol for the scheduled UL transmission, and the LBT operation is performed before the indicated start of the scheduled UL transmission.

Figure 9:
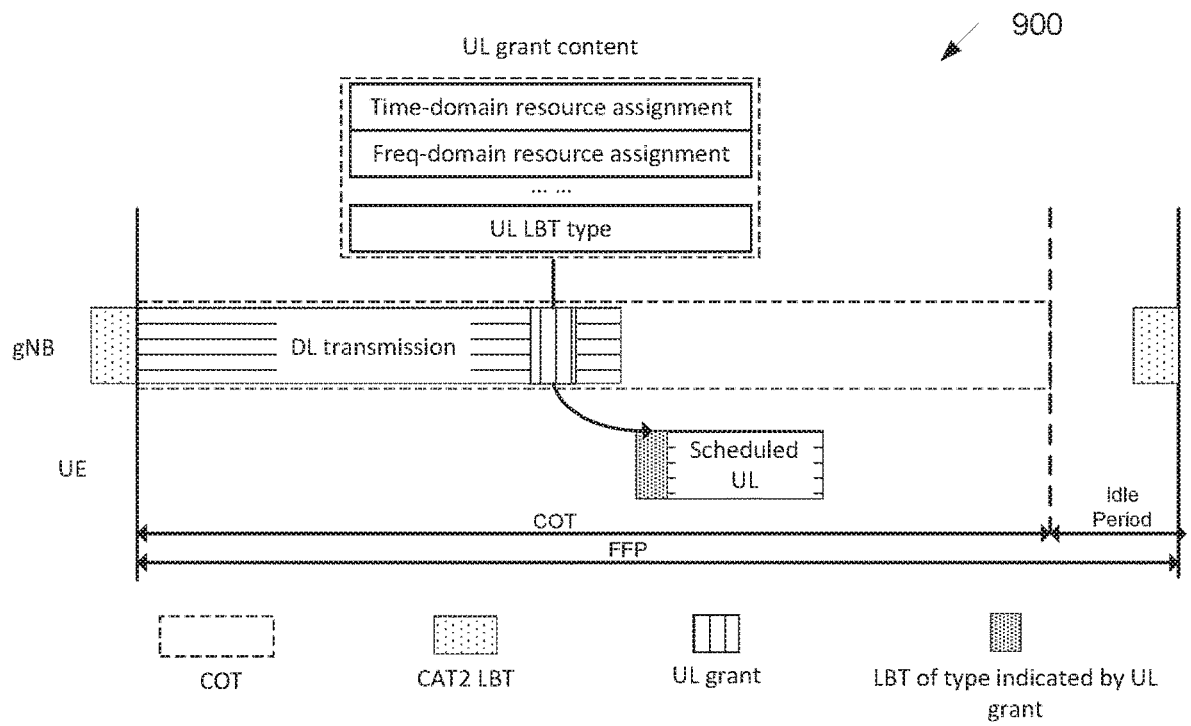
FIG. 9 illustrates an example LBT type for scheduled UL transmission in FBE NR-U according to embodiments of the present disclosure.

FIG. 9 illustrates an example LBT type for scheduled UL transmission in FBE NR-U 900 according to embodiments of the present disclosure. An embodiment of the LBT type for scheduled UL transmission in FBE NR-U 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 9, the LBT type for scheduled UL transmission is indicated by corresponding UL grant.

In one embodiment, the LBT type and/or LBT parameter for UL transmission can be semi-statically configured through higher layer parameter.

In one example, the higher layer parameter can configure the CAT-2 LBT as the default LBT type. In one sub-example, the CAT-2 LBT can refer to the CAT-2 LBT type as in the mentioned embodiments and/or examples.

In one example, the higher layer parameter can configure a default CAT-2 LBT type as one of the 16 μs CAT-2 LBT and 25 μs CAT-2 LBT when CAT-2 LBT is used. In one sub-example, this example can be applied in combination with the mentioned embodiments and/or examples, wherein the CAT-2 LBT can be configured by DCI as the LBT type, the 16 μs CAT-2 LBT or 25 μs CAT-2 LBT can be configured by the higher layer parameter.

In one example, the higher layer parameter can configure the CAT-1 LBT as the default LBT type.

In one example, the higher layer parameter (e.g., RRC parameter) configured LBT type can be overridden by UL grant configured LBT type through dynamic indication.

In one embodiment, the LBT type and/or LBT parameter for UL transmission can be fixed by specification.

In one example, the fixed configuration of LBT type can be one of the CAT-1 LBT and CAT-2 LBT.

In one example, the fixed configuration of LBT type by specification can be overridden by semi-static configuration through higher layer parameter or dynamic configuration through UL grant.

In one embodiment, the LBT type can be determined by the UE through implicit indication, wherein the UE can determine LBT type implicitly (i.e., without explicit LBT type field in the DCI) through configurations by DCI and/or higher layer parameter.

In one example, the configurations by DCI and/or higher layer parameter that can facilitate UE implicit derivation of LBT type can include the COT duration and COT starting position, or the COT ending position corresponding to the COT wherein UL grant is received by the UE. In one sub-example, the COT starting position and COT duration, or the COT ending position can be indicated through one or multiple of GC-PDCCH, UE specific PDCCH, DM-RS, higher layer parameter(s). In another sub-example, based on the gNB COT duration and/or the gNB COT ending position, the UE can determine if the starting position of UL transmission scheduled by the UL grant is within the current gNB COT or not, and that CAT-1 LBT or CAT-2 LBT can be used if the starting position of the scheduled UL transmission is inside the gNB COT, wherein the specific LBT type (CAT-1 LBT, 16 µs CAT-2 LBT or 25 µs CAT-2 LBT) can be either indicated explicitly by DCI or derived implicitly by the UE through. For instance, CAT-1 LBT can be used if the gap between start of UL transmission and end of previous transmission within the COT is within 16 µs, and CAT-2 LBT otherwise.

In one example, the configurations by DCI and/or higher layer parameter that can facilitate UE implicit derivation of LBT type can include the gNB COT structure, which configures the slot format for each slot within the gNB-initiated COT that contains the UL grant. In one sub-example, the COT structure can be obtained by the UE through group common (GC)-PDCCH. In another sub-example, the COT structure can be indicated by the slot format indication (SFI) for each slot within the COT, wherein the SFI may indicate the symbol within a slot of the COT is DL, UL or flexible. In another sub-example, the UE can determine the gap duration from the end of the previous DL transmission within COT to the beginning of a scheduled UL transmission based on the last DL symbol position before the starting position of the scheduled UL transmission, which can be obtained through the gNB COT structure, as well as the UL TA value and/or starting position of the scheduled UL transmission configured by DCI and/or higher layer parameter. For instance, CAT-1 LBT can be used if the gap between start of UL transmission and end of previous transmission within the COT is within 16 µs, and CAT-2 LBT otherwise.

In one example, it can be up to UE implementation to decide the LBT type (e.g., 16/25 µs CAT-2 LBT, CAT-1 LBT) if a scheduled UL transmission of UE can share the gNB-initiated COT containing the UL grant. In one sub-example, the UE can always use 25 µs as the baseline CAT-2 LBT option.

Figure 10:
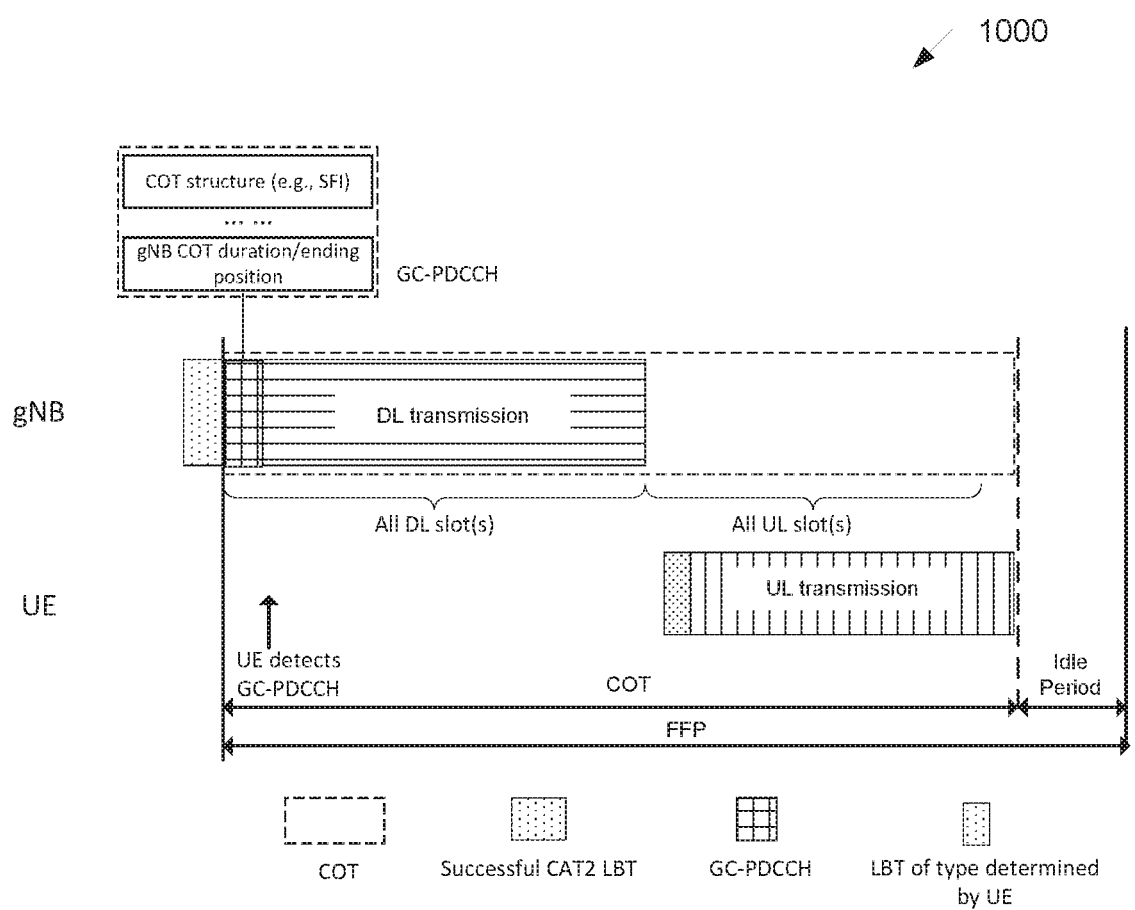
FIG. 10 illustrates another example LBT type for scheduled UL transmission in FBE NR-U according to embodiments of the present disclosure.

FIG. 10 illustrates another example LBT type for scheduled UL transmission in FBE NR-U 1000 according to embodiments of the present disclosure. An embodiment of the LBT type for scheduled UL transmission in FBE NR-U 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 10, the UE can determine that a UL transmission is within the current COT after detecting the GC-PDCCH, and the UE can choose a corresponding UL LBT type according to the COT structure indicated in the GC-PDCCH.

In one embodiment, the scheduled UL transmission for FBE NR-U can be restricted to be contained within the same channel occupancy time of the fixed frame period that contains the UL grant which schedules the UL transmission.

In one example, if a UE has received the UL grant, the UE can always assume that a serving gNB has succeeded in the LBT to obtain the COT, and therefore the UE can transmit the scheduled UL transmission subject to a successful LBT, which can be determined according to one of the mentioned embodiments and/or examples.

In one example, this approach can be achieved by a gNB only choosing values inpusch-TimeDomainAllocationList in the UL grant that can ensure the UL transmission is contained within the current COT.

In one example, if the scheduled UL transmission starts outside the current COT that contains the UL grant, the UE can discard the UL transmission.

In one example, if the scheduled UL transmission is not fully contained within the current COT that contains the UL grant (e.g., partially contained in the idle period), the scheduled PUSCH that falls outside the current COT can be punctured.

In one embodiment, the UL transmission for FBE NR-U can be allowed to be scheduled outside the same channel occupancy time of the fixed frame period that contains the UL grant which schedules the UL transmission.

In one example, if a UE has received the UL grant, the UE can start the scheduled UL transmission if the scheduled UL transmission is within a gNB-obtained COT, and that the UE has succeed in the LBT according to the LBT type determined from one of the mentioned embodiments and/or examples. In one sub-example, the UE can determine if the scheduled UL transmission is within a gNB-obtained COT, or equivalently if a serving gNB has succeeded in LBT to obtain the COT of the FFP wherein the scheduled UL transmission takes place, according to detecting if the serving gNB has transmitted group-common PDCCH (GC-PDCCH) to inform the UEs associated with a gNB about the following transmissions on the COT (which implicitly indicates the gNB has passed LBT in obtaining the COT).

Figure 11:
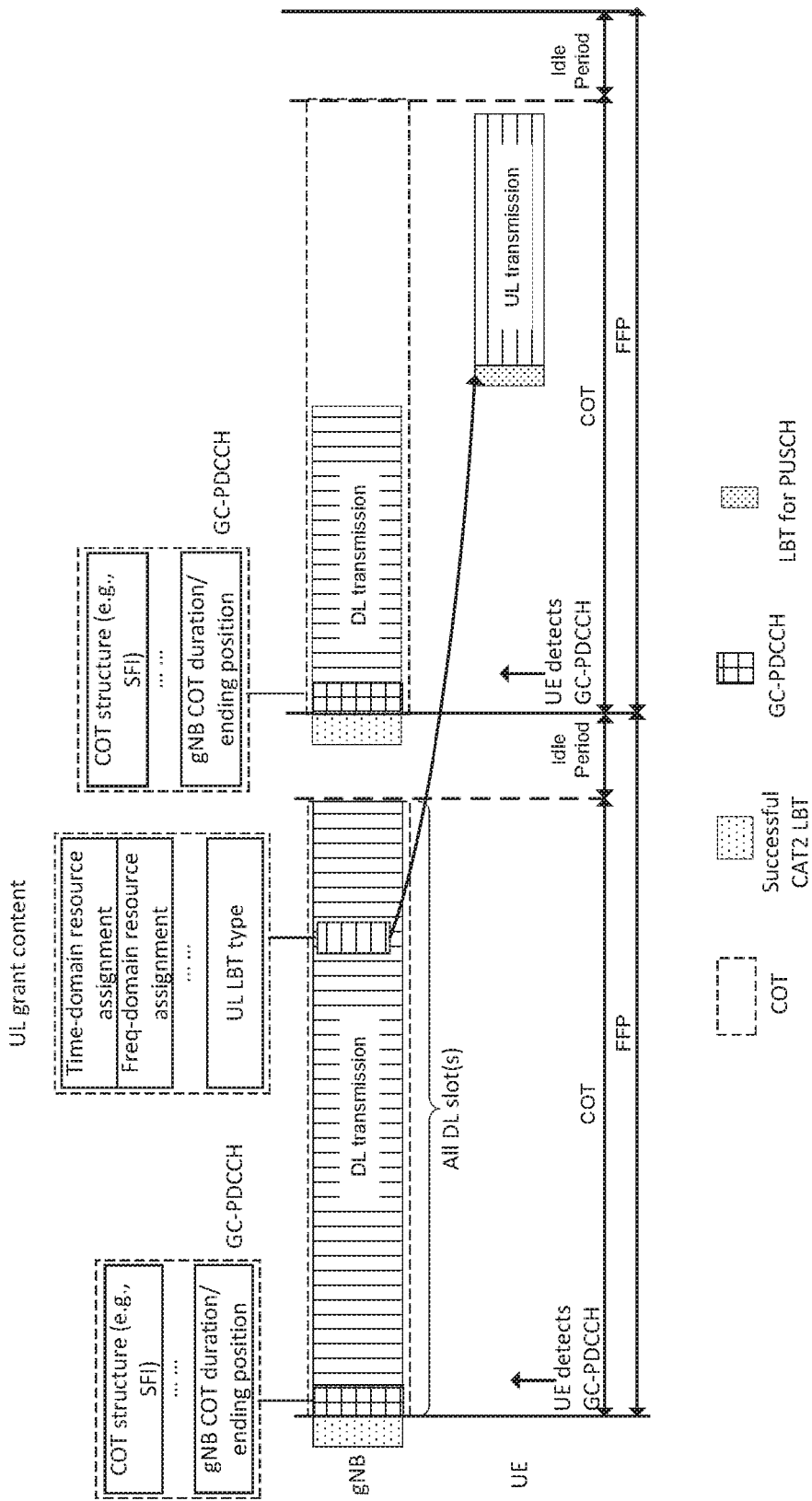
FIG. 11 illustrates yet another example LBT type for scheduled UL transmission in FBE NR-U according to embodiments of the present disclosure.

FIG. 11 illustrates yet another example LBT type for scheduled UL transmission in FBE NR-U 1100 according to embodiments of the present disclosure. An embodiment of the LBT type for scheduled UL transmission in FBE NR-U 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 11, the UL grant schedules an UL transmission in the next FFP (i.e., FFP1) that follows the COT/FFP FFP0) which contains the UL grant; and the gNB has passed the CAT-2 LBT for FFP1 and have correspondingly transmitted the GC-PDCCH, which has been detected by the UE. Therefore, the UE can transmit the scheduled PUSCH after the UE has passed the LBT of type indicated by the UL grant or determined by the UE.

In one example, if the scheduled UL transmission is within an FFP wherein the gNB failed LBT to obtain the corresponding LBT, the UE can discard the scheduled UL transmission.

Figure 12:
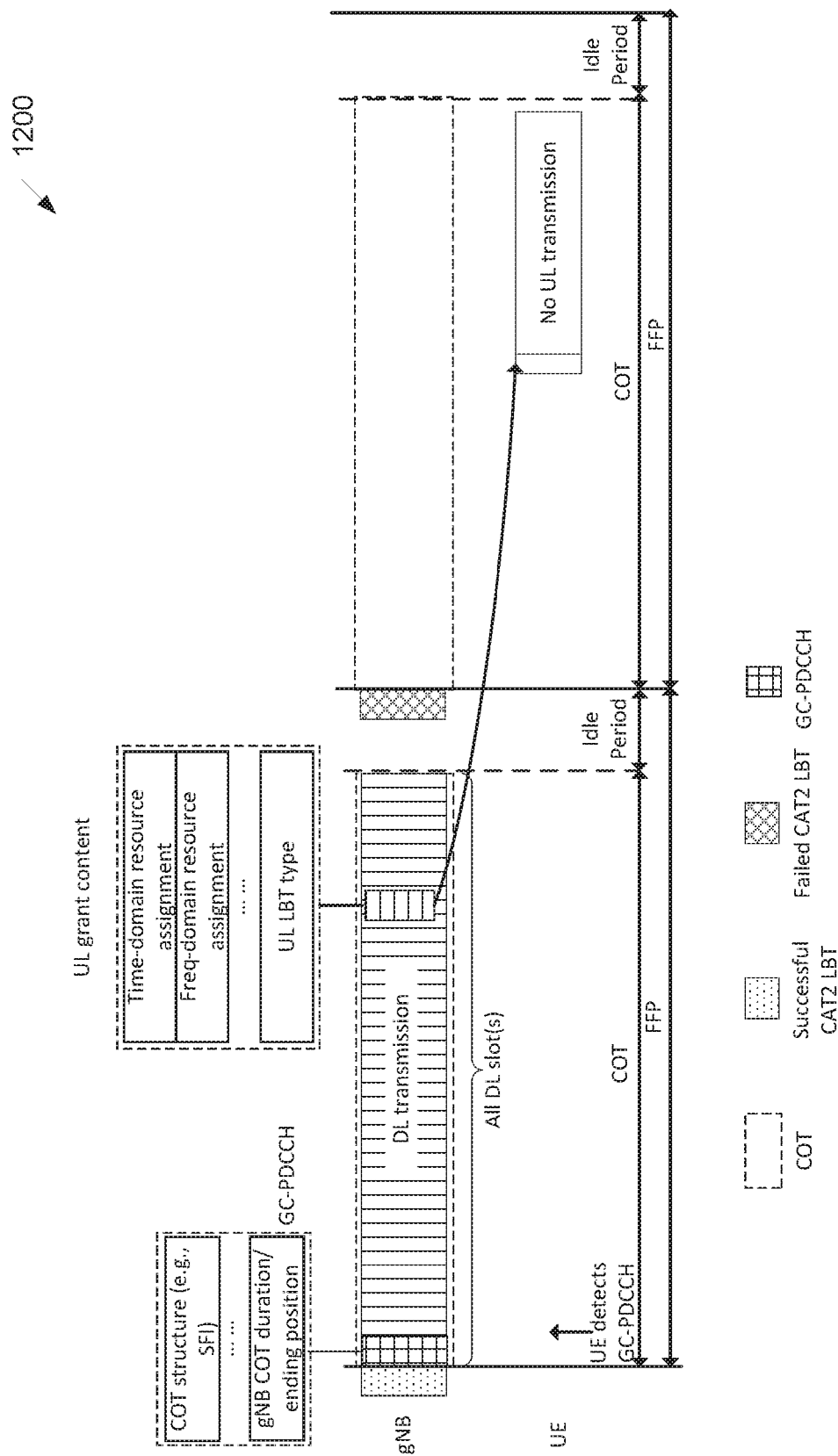
FIG. 12 illustrates yet another example LBT type for scheduled UL transmission in FBE NR-U according to embodiments of the present disclosure.

FIG. 12 illustrates yet another example LBT type for scheduled UL transmission in FBE NR-U 1200 according to embodiments of the present disclosure. An embodiment of the LBT type for scheduled UL transmission in FBE NR-U 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 12, the gNB has failed the CAT-2 LBT to obtain the FFP that follows the FFP containing the UL grant, therefore the UE may discard the scheduled UL transmission which is scheduled within the FFP wherein the gNB has failed LBT.

In one example, if the scheduled UL transmission is within an FFP wherein the gNB failed LBT to obtain the corresponding LBT, the UE can transmit the UL transmission if a CAT-2 LBT performed immediately before the scheduled UL transmission. In one sub-example, this example can be applied regardless of the relative time position of the scheduled UL transmission. In another sub-example, this example can be applied when an FBE NR-U UE can be the initiating device to initiate a COT, wherein an FFP can be configured for the UE and the UL transmission can be scheduled to be at the beginning of the UE-associated FFP.

In one instance, the UE-associated FFP can be applied with the gNB FFP. In another instance, the UE-associated FFP can be different from the gNB-associated FFP. In another instance, the scheduled UL transmission can only start at the beginning of a UE-associated FFP, such that the starting positions for scheduled PUSCH transmission has a granularity of one UE-associated FFP. For example, the gNB can choose appropriate UL grant to PUSCH delay to ensure this. In another example, the UE can initiate the UL transmission in the earliest UE-associated FFP that comes no earlier than the scheduled starting position by the UL grant. In another instance, the UL grant to PUSCH delay (i.e., K2) can be interpreted with a time-domain granularity of a UE-associated FFP. For example, K2=1 indicates the scheduled PUSCH starts at the beginning of the next UE-associated FFP, and a UE needs to pass a CAT-2 LBT before the start of the UE-associated FFP to transmit the scheduled PUSCH.

In another sub-example, this example can be applied when an FBE NR-U UE can be the initiating device to initiate a COT, wherein an FFP can be configured for the UE and the scheduled UL transmission can be in the middle of the UE-associated FFP and follows other UE UL transmissions that start at the beginning of the UE-initiated COT (e.g., CG-PUSCH or RACH). In one instance, the gap between the scheduled UL transmission and the other UE UL transmissions that start at the beginning of the UE-initiated COT can be at most 16 μs. In another instance, the gap between the scheduled UL transmission and the other UE UL transmissions that start at the beginning of the UE-initiated COT can be more than 16 μs, and the UE needs to pass a CAT-2 LBT before the scheduled UL transmission to transmit the scheduled UL transmission.

In one example, if the scheduled UL transmission is not fully contained within the current COT that contains the UL grant (e.g., partially contained in the idle period), the scheduled PUSCH that falls outside the current COT can be punctured.

In one embodiment, enhancements for an FBE NR-U UE detection of gNB-obtained COT is provided. In such embodiment, FBE NR-U UEs are provided to detect if uplink transmission (whether dynamically scheduled, semi-statically configured or semi-persistently configured) is within a gNB-initiated COT.

In one embodiment, the FBE NR-U UE can determine if a serving gNB has obtained the COT of current FFP through monitoring and detecting for GC-PDCCH.

In one example, the GC-PDCCH can be same as Rel-15 NR GC-PDCCH, which refer to a Type3-PDCCH common search space (CSS) set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s).

In one example, the GC-PDCCH can be enhanced from the Rel-15 NR GC-PDCCH, which can further indicate information such as the COT duration/ending time, valid LBT bandwidths that have passed LBT, etc.; and the GC-PDCCH can use a DCI format with CRC scrambled by one of the existing RNTI(s) for GC-PDCCH from NR standard specification; or by introducing a new RNTI for GC-PDCCH for NR-U.

In one example, the UE can determine that a serving gNB has obtained the COT of the current FFP if the UE has detected GC-PDCCH from the gNB.

In one example, the mentioned examples and/or embodiments can be applied to RRC_CONNECTED FBE NR-U UE.

In one example, the mentioned examples and/or embodiments can be applied to RRC_INACTIVE FBE NR-U UE.

In one embodiment, the FBE NR-U UE can determine if a serving gNB has obtained the COT of current FFP through monitoring and detecting for UE-specific UL grant.

In one example, the UE can determine that a serving gNB has obtained the COT of the current FFP if the UE has detected the UE-specific UL grant with CRC scrambled by C-RNTI, MCS-C-RNTI, SP-C SI-RNTI, or CS-RNTI.

In one example, the mentioned examples and/or embodiments can be applied to RRC_CONNECTED FBE NR-U UE.

In one example, the mentioned examples and/or embodiments can be applied to RRC_INACTIVE FBE NR-U UE.

In one embodiment, the FBE NR-U UE can determine if a serving gNB has obtained the COT of current FFP through monitoring and detecting for PDCCH CSS set configured by MIB or by higher layer parameter PDCCH-ConfigCommon in SIB1/RMSI.

In one example, the UE can determine that a serving gNB has obtained the COT of the current FFP if the UE has detected the cell-specific PDCCH from a serving gNB with the DCI format scrambled by a SI-RNTI.

In one example, the UE can determine that a serving gNB has obtained the COT of the current FFP if the UE has detected the cell-specific PDCCH from a serving gNB with the DCI format scrambled by a P-RNTI.

In one example, the UE can determine that a serving gNB has obtained the COT of the current FFP if the UE has detected the UE-specific UL grant with CRC scrambled by C-RNTI, MCS-C-RNTI, SP-CSI-RNTI, or CS-RNTI.

In one example, the mentioned examples and/or embodiments can be applied to RRC_CONNECTED FBE NR-U UE.

In one example, the mentioned examples and/or embodiments can be applied to RRC_INACTIVE FBE NR-U UE.

In one example, the mentioned examples and/or embodiments can be applied to RRC_IDLE FBE NR-U UE.

In one embodiment, the FBE NR-U UE can determine if a serving gNB has obtained the COT of current FFP through monitoring and detecting for the existence of SS/PBCH and/or discovery reference sign (DRS) from a serving gNB.

In one example, the mentioned examples and/or embodiments can be applied to RRC_CONNECTED FBE NR-U UE.

In one example, the mentioned examples and/or embodiments can be applied to RRC_INACTIVE FBE NR-U UE.

In one example, the mentioned examples and/or embodiments can be applied to RRC_IDLE FBE NR-U UE.

In one embodiment, the UE FBE NR-U can determine if a serving gNB has obtained the COT of current FFP through monitoring and detecting for the existence of SIB1 and/or other system information (OSI) from a serving gNB.

In one example, the mentioned examples and/or embodiments can be applied to RRC_CONNECTED FBE NR-U UE.

In one example, the mentioned examples and/or embodiments can be applied to RRC_INACTIVE FBE NR-U UE.

In one example, the mentioned examples and/or embodiments can be applied to RRC_IDLE FBE NR-U UE.

In one embodiment, the FBE NR-U UE can determine if a serving gNB has obtained the COT of current FFP through monitoring and detecting for the paging message, which is scheduled by a PDCCH with a CSS set corresponding to the serving gNB of UE and for a DCI format with CRC scrambled by a P-RNTI.

In one example, the mentioned examples and/or embodiments can be applied to RRC_CONNECTED FBE NR-U UE.

In one example, the mentioned examples and/or embodiments can be applied to RRC_INACTIVE FBE NR-U UE.

In one example, the mentioned examples and/or embodiments can be applied to RRC_IDLE FBE NR-U UE. For instance, this can be applied for IDLE UEs attempting PRACH transmission.

In one embodiment, the FBE NR-U UE can determine if a serving gNB has obtained the COT of current FFP through monitoring and detecting for the short messages transmitted on PDCCH using P-RTNI with or without associated paging messages using short message field in DCI format 1_0.

In one example, the mentioned examples and/or embodiments can be applied to RRC_CONNECTED FBE NR-U UE.

In one example, the mentioned examples and/or embodiments can be applied to RRC_INACTIVE FBE NR-U UE.

In one example, the mentioned examples and/or embodiments can be applied to RRC_IDLE FBE NR-U UE. For instance, this can be applied for IDLE UEs attempting PRACH transmission.

In one example, the short message can include the cell-ID, based on which the UE can determine the short message corresponds to a serving gNB. In one sub-example, the short message field can be increased from 8 bits to 10 bits for indicating the cell-ID.

In one embodiment, the FBE NR-U UE can determine the FFP duration and starting position for each FFP associated with a serving gNB from corresponding configuration in RMSI.

In one embodiment, enhancements to support configured-grant UL transmissions for FBE NR-U is provided. In such embodiment, the signaling and indication methods are provided to support configured grant UL transmissions for FBE NR-U.

In one embodiment, the FBE NR-U can support configured grant uplink transmissions.

In one example, both type 1 configured grant (i.e., semi-statically configured by higher layer parameters) and type 2 configured grant (i.e., semi-persistently scheduled by an UL grant in a valid activation/deactivation DCI) uplink transmissions can be supported by FBE NR-U.

In another example, only type 1 configured grant (i.e., semi-statically configured by higher layer parameters) uplink transmissions can be supported by FBE NR-U.

In yet another example, only type 2 configured grant (i.e., semi-persistently scheduled by an UL grant in a valid activation/deactivation DCI) uplink transmissions can be supported by FBE NR-U.

In one embodiment, the FBE NR-U UE can be initiating device to initiate transmission.

In one example, an explicit signaling from higher layer parameter (e.g., RRC parameter) can be utilized to enable/disable the FBE UE as an initiating device for transmission. In one sub-example, the FBE UE cannot be an initiating device for FBE transmission if the higher layer parameter disables the FBE UE to be the initiating device.

In another sub-example, the FBE UE can be an initiating device for FBE transmission only if the higher layer parameter enables the FBE UE to be the initiating device.

In one example, an explicit L1 signaling (e.g., from DCI) can be utilized to dynamically enable/disable the FBE UE as an initiating device for transmission. In one sub-example, the FBE UE cannot be an initiating device for FBE transmission if the L1 signaling disables the FBE UE to be the initiating device. In another sub-example, the FBE UE can be an initiating device for FBE transmission only if L1 signaling enables the FBE UE to be the initiating device.

In another example, a MAC CE can be utilized to enable/disable the FBE UE as an initiating device for transmission. In one sub-example, the FBE UE cannot be an initiating device for FBE transmission if the MAC CE disables the FBE UE to be the initiating device. In another sub-example, the FBE UE can be an initiating device for FBE transmission only if the MAC CE enables the FBE UE to be the initiating device.

In one example, the FBE NR-U UE can be an initiating device for transmission only if the FBE NR-U UE determines a serving gNB has not obtained the COT associated with current FFP of the gNB. In one sub-example, the FBE NR-U UE can determine if a serving gNB has obtained the COT.

In one example, the FBE NR-U UE can be an initiating device for transmission only if the FBE NR-U UE has non-scheduled UL transmission configured to transmit within current FFP. In one sub-example, the non-scheduled UL transmission can be all or a subset of the configured-grant PUSCH, PRACH, SRS. In another sub-example, the current FFP can refer to the FFP associated with the gNB. In another sub-example, the current FFP can refer to the FFP associated with the UE.

In one example, the FBE NR-U UE can be an initiating device for transmission only if the FBE NR-U UE has scheduled UL transmission configured to transmit within current FFP. In one sub-example, the current FFP can refer to the FFP associated with the gNB. In another sub-example, the current FFP can refer to the FFP associated with the UE.

In one example, an FBE NR-U UE can be an initiating device for transmission if and only if one or multiple of the mentioned examples and/or embodiments are met. In one sub-example, the FBE NR-U UE can be an initiating device if and only if the mentioned examples and/or embodiments are met.

In one example, when a UE is the initiating device for FBE transmissions, the COT duration and/or the FFP duration associated with the UE can be configured by one of semi-static configuration through higher layer parameter, and/or dynamic indication through layer 1 (L1) signaling and activation/de-activation by MAC CE, subject to regulation allowance. In one sub-example, the COT duration and/or the FFP duration associated with an FBE NR-U UE can be explicitly configured with dedicated higher layer parameter, and/or MAC CE, and/or DCI format and/or DCI field. In another sub-example, the COT duration and/or the FFP duration associated with the FBE NR-U UE can be implicitly configured or implicitly inferred from other existing higher layer parameter, and/or MAC CE, and/or DCI format and/or DCI field. For instance, the COT duration and/or FFP duration associated with an NR-U UE can be same as that associated with the gNB.

In one example, when a UE is the initiating device for FBE transmissions, the starting position of the FFP associated with the FBE NR-U UE can be configured by one of semi-static configuration through higher layer parameter, and/or dynamic indication through layer 1 (L1) signaling and activation/de-activation by MAC CE. In one sub-example, the starting position of the FFP associated with the FBE NR-U UE can be explicitly configured with dedicated higher layer parameter, and/or MAC CE, and/or DCI format and/or DCI field. In another sub-example, the starting position of the FFP associated with the FBE NR-U UE can be implicitly configured or implicitly inferred from other existing higher layer parameter, and/or MAC CE, and/or DCI format and/or DCI field.

In one embodiment, the FBE NR-U UE can transmit in the configured grant (CG) PUSCH occasion only through sharing a valid gNB-initiated COT wherein the UE can determine or can be informed that a serving gNB has obtained COT that contains the configured CG PUSCH occasion, and that the UE has passed LBT corresponding to the CG PUSCH occasion.

In one example, the FBE NR-U can determine if a CG PUSCH occasion is within a gNB-initiated COT by following one of examples and/or embodiments.

In one example, the LBT type can be fixed to be CAT-2 LBT.

In one example, the LBT type can be implicitly determined by the UE according to the mentioned examples and/or embodiments.

In one example, the LBT type for CG PUSCH occasion with type 2 CG-PUSCH can be indicated through the PDCCH that is used for activating/de-activating the type-2 CG. In one sub-example, additional field to indicate the LBT type can be introduced for the corresponding DCI format used to activate/de-activate the type-2 configured UL grant, which can be achieved according to the mentioned examples and/or embodiments.

Figure 13:
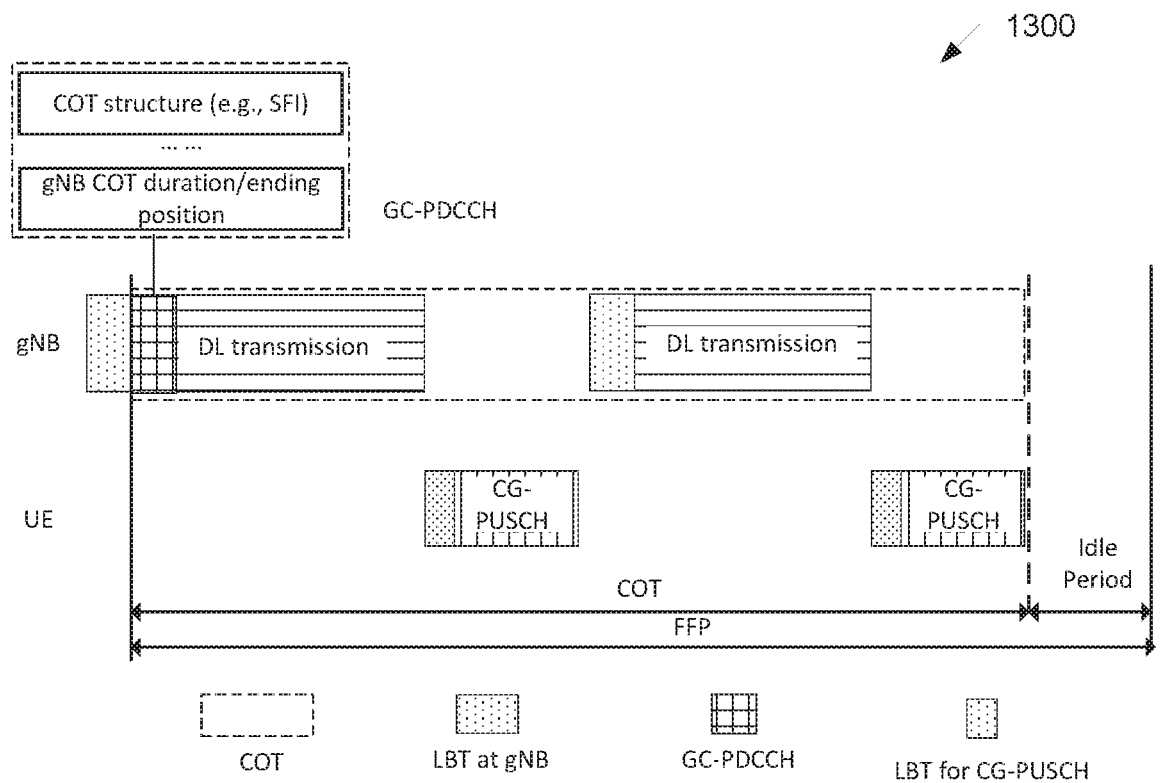
FIG. 13 illustrates yet another example LBT type for scheduled UL transmission in FBE NR-U according to embodiments of the present disclosure.

FIG. 13 illustrates yet another example LBT type for scheduled UL transmission in FBE NR-U 1300 according to embodiments of the present disclosure. An embodiment of the LBT type for scheduled UL transmission in FBE NR-U 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 13, the UE can determine CG-PUSCH occasions are within a gNB-initiated COT by detecting the GC-PDCCH, and the UE can utilize the CG-PUSCH occasions when LBT for CG-PUSCH has passed.

In one embodiment, the FBE NR-U UE can be the initiating device and has an associated COT and/or FFP, such that the FBE NR-U UE transmit in the configured grant (CG) PUSCH occasion if a UE has passed the LBT corresponding to the FFP associated with the UE that contains the CG-PUSCH occasion.

In one example, the COT duration and/or the FFP duration associated with the UE can be configured by one of semi-static configuration through higher layer parameter, and/or dynamic indication through layer 1 (L1) signaling and activation/de-activation by MAC CE, subject to regulation allowance. In one sub-example, the COT duration and/or the FFP duration associated with an FBE NR-U UE can be explicitly configured with dedicated higher layer parameter, and/or MAC CE, and/or DCI format and/or DCI field.

In another sub-example, the COT duration and/or the FFP duration associated with an FBE NR-U UE can be implicitly configured or implicitly inferred from other existing higher layer parameter, and/or MAC CE, and/or DCI format and/or DCI field. For instance, the FFP duration can be the minimum of the periodicity of the configured grant type 1 or type 2, and the maximum FFP duration allowed by the regulation (e.g., 10 ms).

In one example, the CG-PUSCH can be at the beginning of the of the FFP associated with the UE, such that the CG-PUSCH can be transmitted once the UE has passed LBT corresponding to the FFP/COT wherein the CG-PUSCH is configured.

Figure 14:
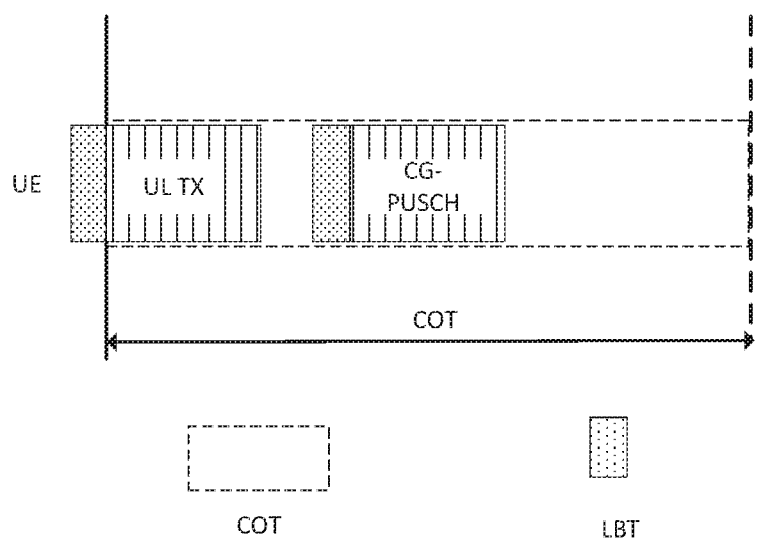
FIG. 14 illustrates an example CG-PUSCH for an FBE UE according to embodiments of the present disclosure.

In one example, the CG-PUSCH can be in the middle of the of the FFP associated with the UE, and such CG-PUSCH can be transmitted if the UE has passed LBT corresponding to the FFP/COT wherein the CG-PUSCH is configured; and that: if there is a gap duration larger than 16 µs with respect to the end of the previous transmission in the COT before the configured CG-PUSCH, the UE has passed a CAT-2 LBT before the CG-PUSCH in the middle of the of the FFP, as illustrated in FIG. 14. FIG. 14 illustrates an example CG-PUSCH for an FBE UE 1400 according to embodiments of the present disclosure. An embodiment of the CG-PUSCH for an FBE UE 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

Figure 15:
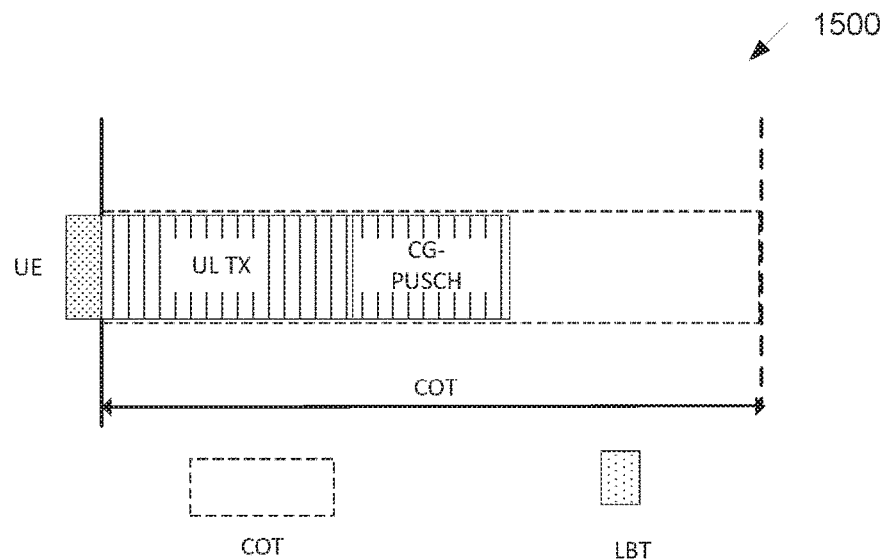
FIG. 15 illustrates another example CG-PUSCH for an FBE UE according to embodiments of the present disclosure.

If a gap duration is at most 16 µs with respect to the end of the previous transmission in the COT before the configured CG-PUSCH, the UE can directly transmit the CG-PUSCH in the middle of the of the FFP, as illustrated in FIG. 15.

FIG. 15 illustrates another example CG-PUSCH for an FBE UE 1500 according to embodiments of the present disclosure. An embodiment of the CG-PUSCH for an FBE UE 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

In one example, the FFP duration and/or the COT duration associated with the UE can be fixed in the specification.

In one example, the FFP duration and/or the COT duration associated with the UE can be the same as that of the periodicity for configured grant transmission. In one sub-example, the CG-PUSCH can be at the beginning of the of the FFP associated with the UE, such that the CG-PUSCH can be transmitted once the UE has passed LBT corresponding to the FFP/COT wherein the CG-PUSCH is configured.

Figure 16:
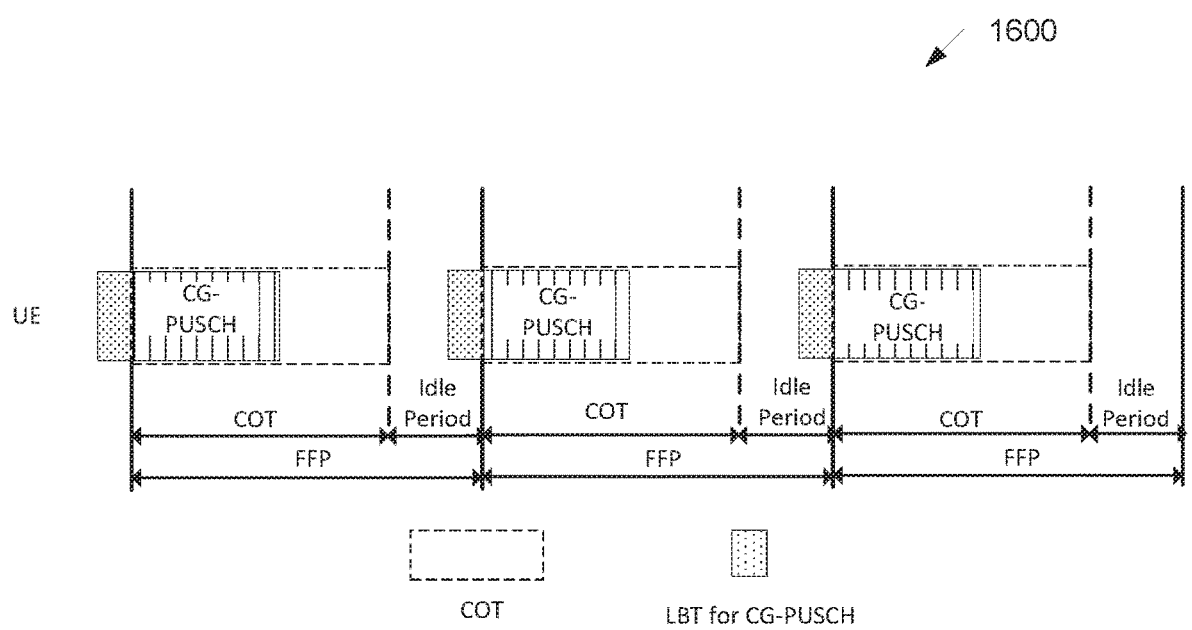
FIG. 16 illustrates yet another example CG-PUSCH for an FBE UE according to embodiments of the present disclosure.

FIG. 16 illustrates yet another example CG-PUSCH for an FBE UE 1600 according to embodiments of the present disclosure. An embodiment of the CG-PUSCH for an FBE UE 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 16, a configured grant type 1 is used.

Figure 17:
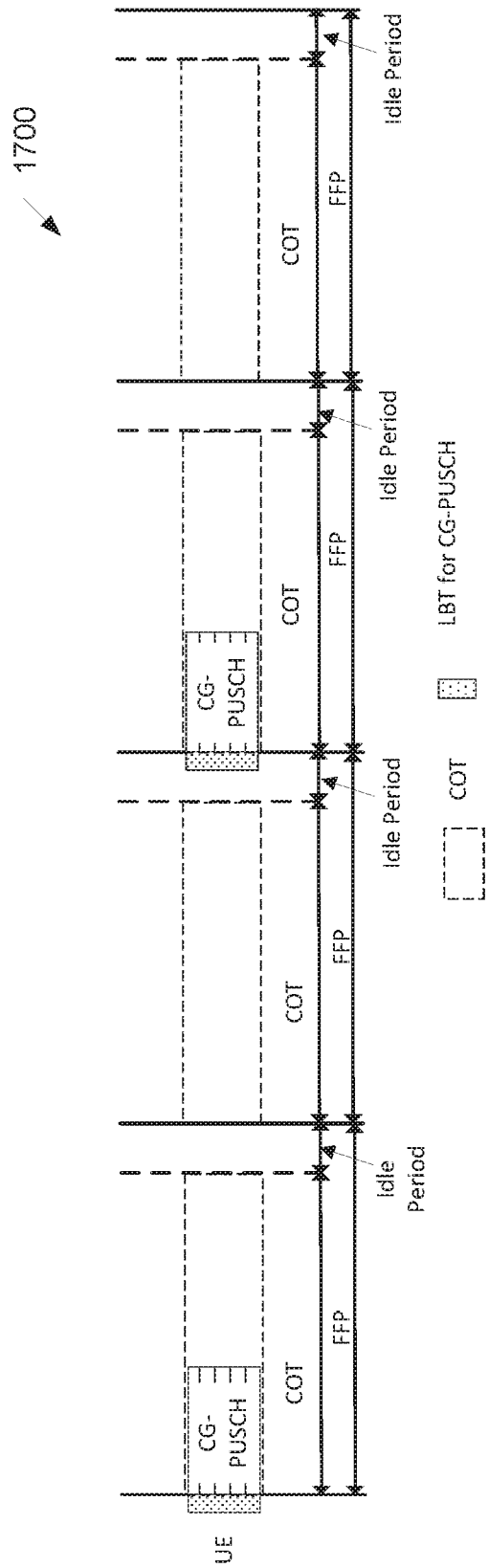
FIG. 17 illustrates yet another example CG-PUSCH for an FBE UE according to embodiments of the present disclosure.

FIG. 17 illustrates yet another example CG-PUSCH for an FBE UE 1700 according to embodiments of the present disclosure. An embodiment of the CG-PUSCH for an FBE UE 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 17, a configured grant type 2 is used and the UE can transmit in CG-PUSCH if CG-PUSCH is activated in a FFP and the UE has passed LBT; and the UE does not need to perform LBT if CG-PUSCH is de-activated in a FFP.

In one example, the periodicity for configured grant transmission can be an integer multiple of the FFP duration and/or the COT duration associated with the UE. In one sub-example, the CG-PUSCH can be at the beginning of the of the FFP associated with the UE, such that the CG-PUSCH can be transmitted once the UE has passed LBT corresponding to the FFP/COT wherein the CG-PUSCH is configured.

As illustrated in FIG. 17, the UE can transmit in CG-PUSCH if CG-PUSCH is activated in a FFP and the UE has passed LBT; and the UE does not need to perform LBT if CG-PUSCH is de-activated in a FFP or the FFP does not contain a CG-PUSCH.

In one example, the FFP duration and/or the COT duration associated with the UE can be an integer multiple of the periodicity for configured grant transmission. In one sub-example, the CG-PUSCH can be at the beginning of the of the FFP associated with the UE, and such CG-PUSCH at the beginning of the FFP can be transmitted once the UE has passed LBT corresponding to the FFP/COT wherein the CG-PUSCH is configured. In another sub-example, the CG-PUSCH can be in the middle of the of the FFP associated with the UE, and such CG-PUSCH can be transmitted if the UE has passed LBT corresponding to the FFP/COT wherein the CG-PUSCH is configured; and that if there is a gap duration larger than 16 μs with respect to the CG-PUSCH in the beginning of the FFP, the UE has passed a CAT-2 LBT before the CG-PUSCH in the middle of the of the FFP, as illustrated in FIG. 18.

Figure 18:
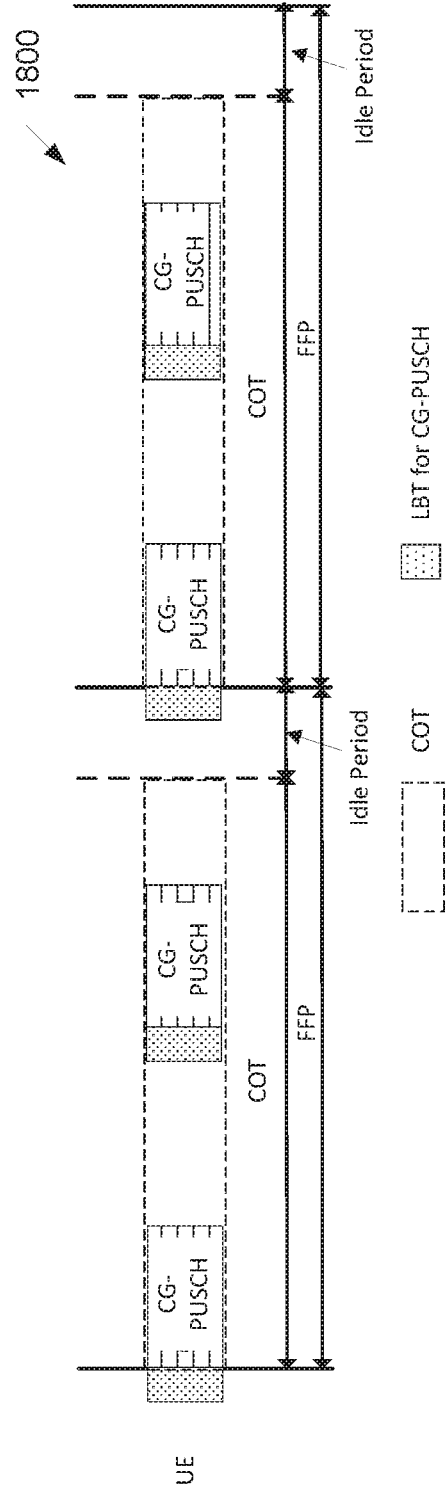
FIG. 18 illustrates yet another example CG-PUSCH for an FBE UE according to embodiments of the present disclosure.

FIG. 18 illustrates yet another example CG-PUSCH for an FBE UE 1800 according to embodiments of the present disclosure. An embodiment of the CG-PUSCH for an FBE UE 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

In one example, the FFP duration and/or the COT duration associated with the UE do not need to start with a CG-PUSCH at the beginning of the FFP duration and/or the COT duration. In one sub-example, this can happen when (periodicity of CG-PUSCH/FFP=m/n) with m and n both being integer values. In another sub-example, this can be applied when different FBE UEs are utilizing a synchronized FFP.

In one example, the mentioned examples and/or embodiments can be used only if the gNB has failed LBT corresponding to obtain the COT associated with the gNB that contains the CG-PUSCH; or the mentioned embodiments and/or examples can always be utilized by the UE to transmit CG-PUSCH irrespective if the gNB has obtained the COT or not.

In one example, the mentioned embodiments and/or examples can be applied to other periodic uplink transmission such as the periodic sounding reference signal (SRS) for FBE NR-U in addition to CG-PUSCH.

In one embodiment, enhancements to support PRACH transmissions for FBE NR-U is provided. In such embodiment, enhancement of the FBE NR-U is provided to support PRACH transmissions.

In one embodiment, the FBE NR-U can support PRACH transmissions by the UE.

In one example, the IDLE UE can transmit PRACH which is configured by higher layer parameters.

In one example, the UE can also transmit PRACH scheduled through PDCCH order or DCI.

In one example, the UE can also transmit PRACH that follows the DRS.

In one embodiment, the FBE NR-U UE can transmit PRACH only through sharing a valid gNB-initiated COT wherein the UE can determine or can be informed that a serving gNB has obtained COT that contains the UE-associated RACH occasion (RO), and that the UE has passed LBT corresponding to the RO.

In one example, the FBE NR-U can determine if a CG PUSCH occasion is within a gNB-initiated COT by following one of examples and/or embodiment.

In one example, the LBT type can be fixed to be CAT-2 LBT.

In one example, the LBT type can be implicitly determined by the UE according to the mentioned embodiments and/or examples.

In one example, the LBT type can be explicitly indicated to the UE according through PDCCH order or other DCI formats.

In one embodiment, the FBE NR-U UE can be the initiating device and has an associated COT and/or FFP, such that the FBE NR-U UE transmit in the configured valid RACH occasion if the UE has passed the LBT corresponding to the FFP associated with the UE that contains the RACH occasion.

In one example, the COT duration and/or the FFP duration associated with the UE can be configured by one of semi-static configuration through higher layer parameter, and/or dynamic indication through layer 1 (L1) signaling and activation/de-activation by MAC CE, subject to regulation allowance.

In one sub-example, the COT duration and/or the FFP duration associated with an FBE NR-U UE can be explicitly configured with dedicated higher layer parameter, and/or MAC CE, and/or DCI format and/or DCI field.

In another sub-example, the COT duration and/or the FFP duration associated with an FBE NR-U UE can be implicitly configured or implicitly inferred from other existing higher layer parameter, and/or MAC CE, and/or DCI format and/or DCI field. For instance, the FFP duration can be the minimum of the PRACH configuration period, and the maximum FFP duration allowed by the regulation (e.g., 10 ms).

In one example, the FFP duration and/or the COT duration associated with the UE can be fixed in the specification. For instance, since the PRACH configuration period is an integer multiple of 10 ms, the FFP duration can be set as 10 ms.

In one example, an RO can be at the beginning of the of the FFP associated with the UE, such that the PRACH can be transmitted once the UE has passed LBT corresponding to the FFP/COT wherein the RO is configured.

In one example, an RO can be in the middle of the COT/FFP associated with the UE, and the UE can transmit PRACH if the UE has passed LBT corresponding to the FFP/COT wherein the RO is configured; and that: if there is a gap duration larger than 16 µs with respect to the end of the previous transmission in the COT before the configured RO, and the UE has passed a CAT-2 LBT before the RO; or if there is a gap duration of at most 16 µs with respect to the end of the previous transmission in the COT before the configured RO, the UE can directly transmit the PRACH in the configured RO.

In one example, the FFP duration and/or the COT duration associated with the UE can be the same as that of the PRACH configuration period. In one sub-example, this condition happens when both the PRACH configuration period and UE FFP are 10 ms.

Figure 19:
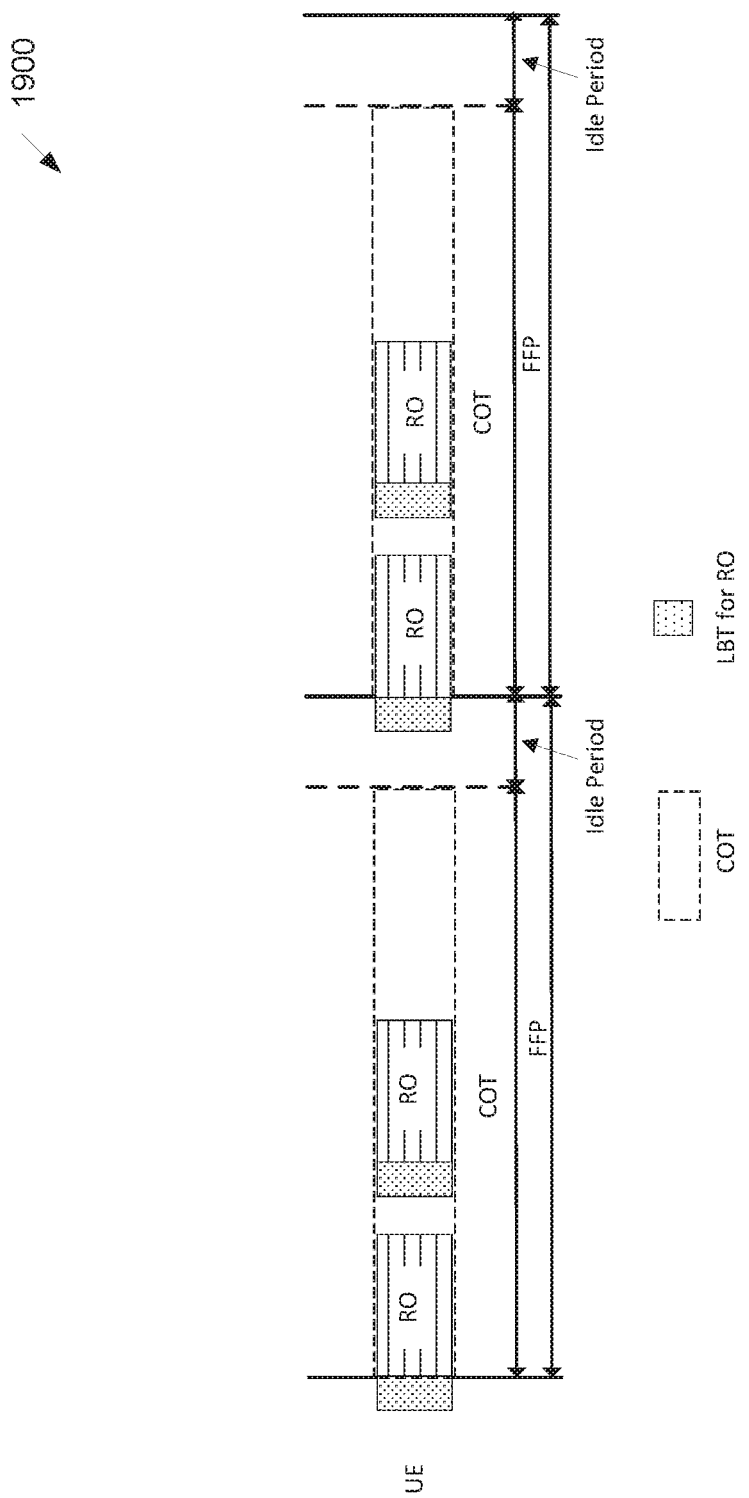
FIG. 19 illustrates an example RO for an FBE UE according to embodiments of the present disclosure.

FIG. 19 illustrates an example RO for an FBE UE 1900 according to embodiments of the present disclosure. An embodiment of the RO for an FBE UE 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 19, two ROs (not evenly distributed within the COT/FFP) are configured for an FBE UE within an FFP, wherein the FFP is same as the PRACH configuration period.

In one example, the UE-configured RO positions can repeat in a periodic pattern wherein the pattern periodicity can be an integer multiple of the FFP duration associated with the UE. In one sub-example, such periodic pattern can have the periodicity of the PRACH configuration period, or association period between SSB and RO, or association pattern period between the SSB and RO.

In one embodiment, the RACH occasion validation rule can be enhanced from Rel-15 NR, such that RO that overlaps with IDLE period of the FBE fixed frame period can be considered as invalid.

In one example, the FBE FFP can be the FFP associated with the FBE NR-U gNB. In one sub-example, this can be applied when the mentioned embodiments and/or examples are used, such that the UE can transmit RO by only sharing gNB-initiated COT.

In one example, the FBE FFP can be the FFP associated with the FBE NR-U UE. In one sub-example, this can be applied when the UE can transmit PRACH through UE-initiated COT wherein the UE is the initiating device.

In one example, the FBE NR-U has PRACH validation rule as follows: if a UE is provided TDD-UL-DL-ConfigurationCommon, a PRACH occasion in a PRACH slot is valid if the RO does not overlap with the IDLE period of the FFP of the initiating device to transmit PRACH, and: the PRACH occasion is within UL symbols, or the PRACH occasion does not precede a SS/PBCH block in the PRACH slot and starts at least gap N symbols after a last downlink symbol and at least gap N symbols after a last SS/PBCH block transmission symbol, where gap N is fixed in spec or configured by higher layer parameter or DCI.

Figure 20:
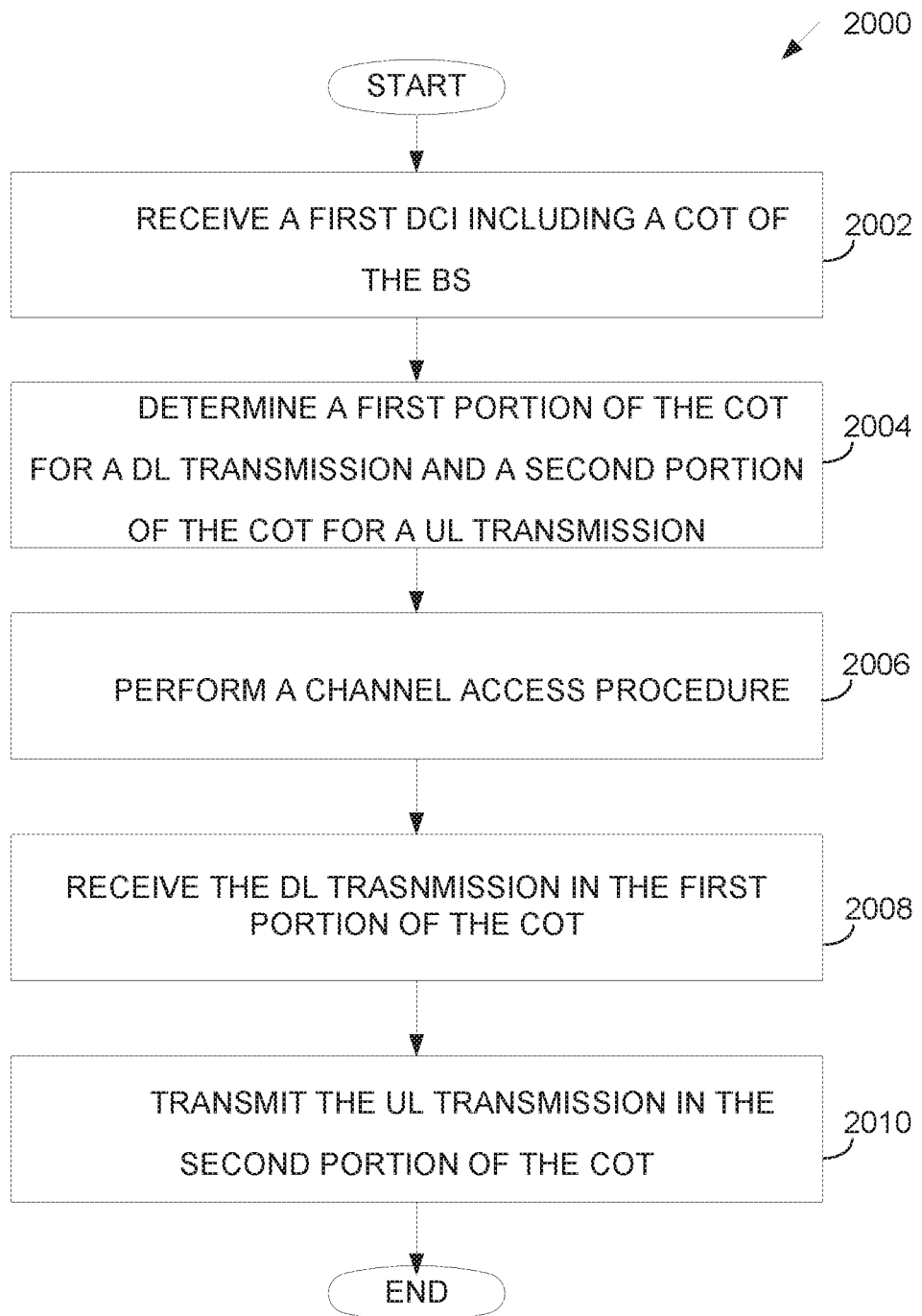
FIG. 20 illustrates a flow chart of a method for uplink transmission in frame-based equipment NR unlicensed according to embodiments of the present disclosure.

FIG. 20 illustrates a flow chart of a method 2000 for uplink transmission in frame-based equipment NR unlicensed according to embodiments of the present disclosure, as may be performed by a user equipment (e.g., 111-116 as illustrated in FIG. 1). An embodiment of the method 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 20, the method 2000 begins at step 2002. In step 2002, the UE in a wireless communication system supporting a shared spectrum channel access receives, from a base station (BS) over a shared spectrum channel, a first downlink control information (DCI) including a channel occupancy time (COT) of the BS.

Subsequently, the UE in step 2004 determines a first portion of the COT for a downlink transmission from the BS and a second portion of the COT for an uplink transmission to the BS, wherein the COT includes a gap between the first and second portions of the COT.

Subsequently, the UE in step 2006 performs a channel access procedure based on a duration of the gap.

In one embodiment, the channel access procedure does not include a time duration for sensing the shared spectrum channel, the duration of the gap being no longer than 16 microseconds.

In one embodiment, the channel access procedure includes a time duration of 16 microseconds for sensing the shared spectrum channel, the duration of the gap being longer than 16 microseconds.

Next, the UE in step 2008 receives, from the BS over the shared spectrum channel, the downlink transmission in the first portion of the COT.

Finally, the UE in step 2010 transmits, to the BS over the shared spectrum channel, the uplink transmission in the second portion of the COT based on a sensing status of the shared spectrum channel that is sensed as an idle state during the channel access procedure in the duration of the gap.

In one embodiment, the UE identifies an operation mode of the BS and, based on identifying that the operation mode of the BS is a semi-static mode, further identifies that a period exists before starting the COT during which transmissions are not allowed.

In on embodiment, the UE determines that a physical random access channel (PRACH) occasion is valid, wherein the PRACH occasion does not overlap with a period before starting the COT during which transmissions are not allowed.

In on embodiment, the UE determines a second DCI from the downlink transmission included in the first portion of the COT.

In such embodiment, the second DCI includes a type of channel access operation for the uplink transmission included in the second portion of the COT; and the type of channel access operation is one of: a type of channel access procedure not including a time duration for sensing the shared spectrum channel, or a type of channel access procedure including a time duration of 16 microseconds for sensing the shared spectrum channel.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
    a transceiver configured to receive, from a base station (BS), first downlink control information (DCI) including a channel occupancy time (COT) of the BS; and
    a processor operably connected to the transceiver, the processor configured to:
        determine a first portion of the COT for a downlink transmission from the BS and a second portion of the COT for an uplink transmission to the BS, wherein the COT includes a gap between the first and second portions of the COT;
        identify an operation mode of the BS, wherein the operation mode of the BS is a semi-static mode including a period, before starting the COT, during which transmissions are not allowed; and
        perform a channel access procedure based on a duration of the gap,
    wherein the transceiver is further configured to:
        receive, from the BS over a shared spectrum channel, the downlink transmission in the first portion of the COT, and
        transmit, to the BS over the shared spectrum channel, the uplink transmission in the second portion of the COT, if the shared spectrum channel is sensed as an idle state during the channel access procedure performed in the duration of the gap.

2. The UE of claim 1, wherein the channel access procedure does not include a time duration for sensing the shared spectrum channel if the duration of the gap is no longer than 16 microseconds.

3. The UE of claim 1, wherein the channel access procedure includes a time duration of 16 microseconds for sensing the shared spectrum channel, if the duration of the gap is longer than 16 microseconds.

4. The UE of claim 1, wherein the processor is further configured to determine that a physical random access channel (PRACH) occasion is valid, if the PRACH occasion does not overlap with the period.

5. The UE of claim 1, wherein:
    the processor is further configured to determine second DCI from the downlink transmission included in the first portion of the COT; and
    the second DCI includes a type of channel access operation for the uplink transmission included in the second portion of the COT.

6. The UE of claim 5, wherein the type of channel access operation is one of:
    a type of channel access procedure not including a time duration for sensing the shared spectrum channel; or
    a type of channel access procedure including a time duration of 16 microseconds for sensing the shared spectrum channel.

7. A base station (BS) in a wireless communication system, the BS comprising:
    a processor configured to:
        determine a first portion of channel occupancy time (COT) for a downlink transmission to a user equipment (UE) and a second portion of the COT for an uplink transmission from the UE, wherein the COT includes a gap between the first and second portions of the COT,
        identify an operation mode of the BS, wherein the operation mode of the BS is a semi-static mode including a period, before starting the COT, during which transmissions are not allowed; and
    a transceiver operably connected to the processor, the transceiver configured to:
        transmit, to the UE, first downlink control information (DCI) including the COT of the BS,
        transmit, to the UE over a shared spectrum channel, the downlink transmission in the first portion of the COT, and
        receive, from the UE over the shared spectrum channel, the uplink transmission in the second portion of the COT, if the shared spectrum channel is sensed as an idle state during a channel access procedure that is performed based on a duration of the gap.

8. The BS of claim 7, wherein the channel access procedure does not include a time duration for sensing the shared spectrum channel if the duration of the gap is no longer than 16 microseconds.

9. The BS of claim 7, wherein the channel access procedure includes a time duration of 16 microseconds for sensing the shared spectrum channel if the duration of the gap is longer than 16 microseconds.

10. The BS of claim 7, wherein a physical random access channel (PRACH) occasion is valid, if the PRACH occasion does not overlap with the period.

11. The BS of claim 7, wherein:
    the processor is further configured to generate second DCI to be transmitted in the downlink transmission included in the first portion of the COT; and
    the second DCI includes a type of channel access operation for the uplink transmission included in the second portion of the COT.

12. The BS of claim 11, wherein the type of channel access operation is one of:
    a type of channel access procedure not including a time duration for sensing the shared spectrum channel; or
    a type of channel access procedure including a time duration of 16 microseconds for sensing the shared spectrum channel.

13. A method of a user equipment (UE) in a wireless communication system, the method comprising:
- receiving, from a base station (BS), first downlink control information (DCI) including a channel occupancy time (COT) of the BS;
- determining a first portion of the COT for a downlink transmission from the BS and a second portion of the COT for an uplink transmission to the BS, wherein the COT includes a gap between the first and second portions of the COT;
- identifying an operation mode of the BS, wherein the operation mode of the BS is a semi-static mode including a period, before starting the COT, during which transmissions are not allowed;
- performing a channel access procedure based on a duration of the gap;
- receiving, from the BS over the shared spectrum channel, the downlink transmission in the first portion of the COT; and
- transmitting, to the BS over the shared spectrum channel, the uplink transmission in the second portion of the COT based on a sensing status of the shared spectrum channel that is sensed as an idle state during the channel access procedure performed in the duration of the gap.

14. The method of claim 13, wherein the channel access procedure includes a time duration for sensing the shared spectrum channel, when the duration of the gap is longer than 16 microseconds.

15. The method of claim 13, wherein the channel access procedure includes a time duration of 16 microseconds for sensing the shared spectrum channel, the duration of the gap being longer than 16 microseconds.

16. The method of claim 13, further comprising determining that a physical random access channel (PRACH) occasion is valid, wherein the PRACH occasion does not overlap with the period.

17. The method of claim 13, further comprising determining second DCI from the downlink transmission included in the first portion of the COT,
wherein:
- the second DCI includes a type of channel access operation for the uplink transmission included in the second portion of the COT; and
- the type of channel access operation is one of:
  - a type of channel access procedure not including a time duration for sensing the shared spectrum channel, or
  - a type of channel access procedure including a time duration of 16 microseconds for sensing the shared spectrum channel.

* * * * *